US010217087B2

(12) United States Patent
Henry et al.

(10) Patent No.: US 10,217,087 B2
(45) Date of Patent: *Feb. 26, 2019

(54) MULTICOMPUTER PROCESSING OF CLIENT DEVICE REQUEST DATA USING CENTRALIZED EVENT ORCHESTRATOR

(71) Applicant: Bank of America Corporation, Charlotte, NC (US)

(72) Inventors: Dean L. Henry, Charlotte, NC (US); Joseph Benjamin Castinado, Northglenn, CO (US); Brandon Castagna, Mount Holly, NC (US); Rob Oddy, London (GB)

(73) Assignee: Bank of America Corporation, Charlotte, NC (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/372,977

(22) Filed: Dec. 8, 2016

(65) Prior Publication Data

US 2018/0165647 A1 Jun. 14, 2018

(51) Int. Cl.
*G06Q 10/00* (2012.01)
*G06Q 10/10* (2012.01)
*H04L 29/08* (2006.01)

(52) U.S. Cl.
CPC ........... *G06Q 10/109* (2013.01); *H04L 67/22* (2013.01); *H04L 67/306* (2013.01)

(58) Field of Classification Search
CPC .................. G06F 17/30864; H04L 63/0876
See application file for complete search history.

(56) References Cited

U.S. PATENT DOCUMENTS

| 5,787,402 | A | 7/1998 | Potter et al. |
| 6,247,000 | B1 | 6/2001 | Hawkins et al. |
| 6,721,716 | B1 | 4/2004 | Gross |
| 7,580,886 | B1 | 8/2009 | Schulz |
| 7,689,483 | B2 | 3/2010 | Wu et al. |
| 8,560,452 | B2 | 10/2013 | Lynch et al. |
| 8,606,705 | B2 | 12/2013 | Zanzot et al. |
| 8,620,805 | B2 | 12/2013 | Davis et al. |
| 9,087,215 | B2 * | 7/2015 | LaFever .............. G06F 21/6254 |

(Continued)

*Primary Examiner* — Abiy Getachew
(74) *Attorney, Agent, or Firm* — Banner & Witcoff, Ltd.; Michael A. Springs

(57) ABSTRACT

Aspects of the disclosure relate to multicomputer processing of client device request data using a centralized event orchestrator. A computing platform may receive event definition information defining an event as well as stimulus selection information. Subsequently, the computing platform may receive a request for a recipient-selection user interface. The computing platform may identify one or more stimulus options available for a user of a recipient computing device associated with the event and may send a delivery selection user interface that includes a user-selectable component, which, when invoked, causes the computing platform to create a new endpoint associated with a stimulus option. Thereafter, the computing platform may receive delivery selection information and may generate one or more event orchestration commands directing an event processor to execute one or more actions associated with the event. The computing platform then may send the one or more event orchestration commands to the event processor.

20 Claims, 15 Drawing Sheets

(56) References Cited

U.S. PATENT DOCUMENTS

| | | |
|---|---|---|
| 9,779,253 B2* | 10/2017 | Mahaffey ............ H04L 63/1433 |
| 9,781,148 B2* | 10/2017 | Mahaffey ............ H04L 63/1433 |
| 2010/0280949 A1 | 11/2010 | Van Rensburg |
| 2011/0282780 A1 | 11/2011 | French et al. |
| 2016/0182331 A1 | 6/2016 | Iannaccone et al. |
| 2016/0184701 A1 | 6/2016 | Weston et al. |
| 2016/0187654 A1 | 6/2016 | Border et al. |
| 2016/0188181 A1 | 6/2016 | Smith |
| 2016/0189299 A1 | 6/2016 | Chiulli et al. |
| 2016/0196553 A1 | 7/2016 | Barhydt |
| 2016/0196587 A1 | 7/2016 | Eder |
| 2016/0196608 A1 | 7/2016 | Chiulli et al. |
| 2016/0197993 A1 | 7/2016 | Perkowski et al. |
| 2016/0205174 A1 | 7/2016 | Pitio et al. |
| 2016/0209648 A1 | 7/2016 | Haddick et al. |
| 2016/0210224 A1 | 7/2016 | Cohen et al. |
| 2016/0210605 A1 | 7/2016 | Vaish et al. |
| 2016/0217258 A1 | 7/2016 | Pitroda et al. |
| 2016/0219152 A1 | 7/2016 | Fernandez et al. |
| 2016/0224951 A1 | 8/2016 | Hoffberg |
| 2016/0226308 A1 | 8/2016 | Valin et al. |
| 2016/0226836 A1 | 8/2016 | Garcia et al. |
| 2016/0240050 A1 | 8/2016 | Block et al. |
| 2016/0246616 A1 | 8/2016 | Kwong |
| 2016/0247148 A1 | 8/2016 | Jivan et al. |
| 2016/0253360 A1 | 9/2016 | Gradin et al. |
| 2016/0253650 A1 | 9/2016 | Cohen |
| 2016/0260067 A1 | 9/2016 | Holman et al. |
| 2016/0260069 A1 | 9/2016 | Holman et al. |
| 2016/0266939 A1 | 9/2016 | Shear et al. |
| 2016/0275558 A1 | 9/2016 | Tiku et al. |
| 2016/0275760 A1 | 9/2016 | Block et al. |
| 2016/0283923 A1 | 9/2016 | Hertel et al. |
| 2016/0291863 A1 | 10/2016 | Miron |
| 2016/0292683 A1 | 10/2016 | Song et al. |
| 2016/0292786 A1 | 10/2016 | Khizhnyak et al. |
| 2016/0292963 A1 | 10/2016 | Chun et al. |
| 2016/0300196 A1 | 10/2016 | Guido et al. |
| 2016/0300197 A1 | 10/2016 | Guido et al. |
| 2016/0300198 A1 | 10/2016 | Guido et al. |
| 2016/0300199 A1 | 10/2016 | Guido et al. |
| 2016/0300204 A1 | 10/2016 | Guido et al. |
| 2016/0306751 A1 | 10/2016 | Amarendran et al. |
| 2016/0306984 A1 | 10/2016 | Amarendran et al. |
| 2016/0314443 A1 | 10/2016 | Liberty |
| 2016/0314640 A1 | 10/2016 | Ward et al. |
| 2016/0321624 A1 | 11/2016 | Brunner |
| 2016/0328706 A1 | 11/2016 | Kennedy |
| 2016/0328723 A1 | 11/2016 | Cunnane |
| 2016/0342977 A1 | 11/2016 | Lam |
| 2016/0343081 A1 | 11/2016 | Somech et al. |
| 2016/0343094 A1 | 11/2016 | Forbes, Jr. |
| 2016/0343100 A1 | 11/2016 | Davenport et al. |
| 2016/0350856 A1 | 12/2016 | Sandhu et al. |

* cited by examiner

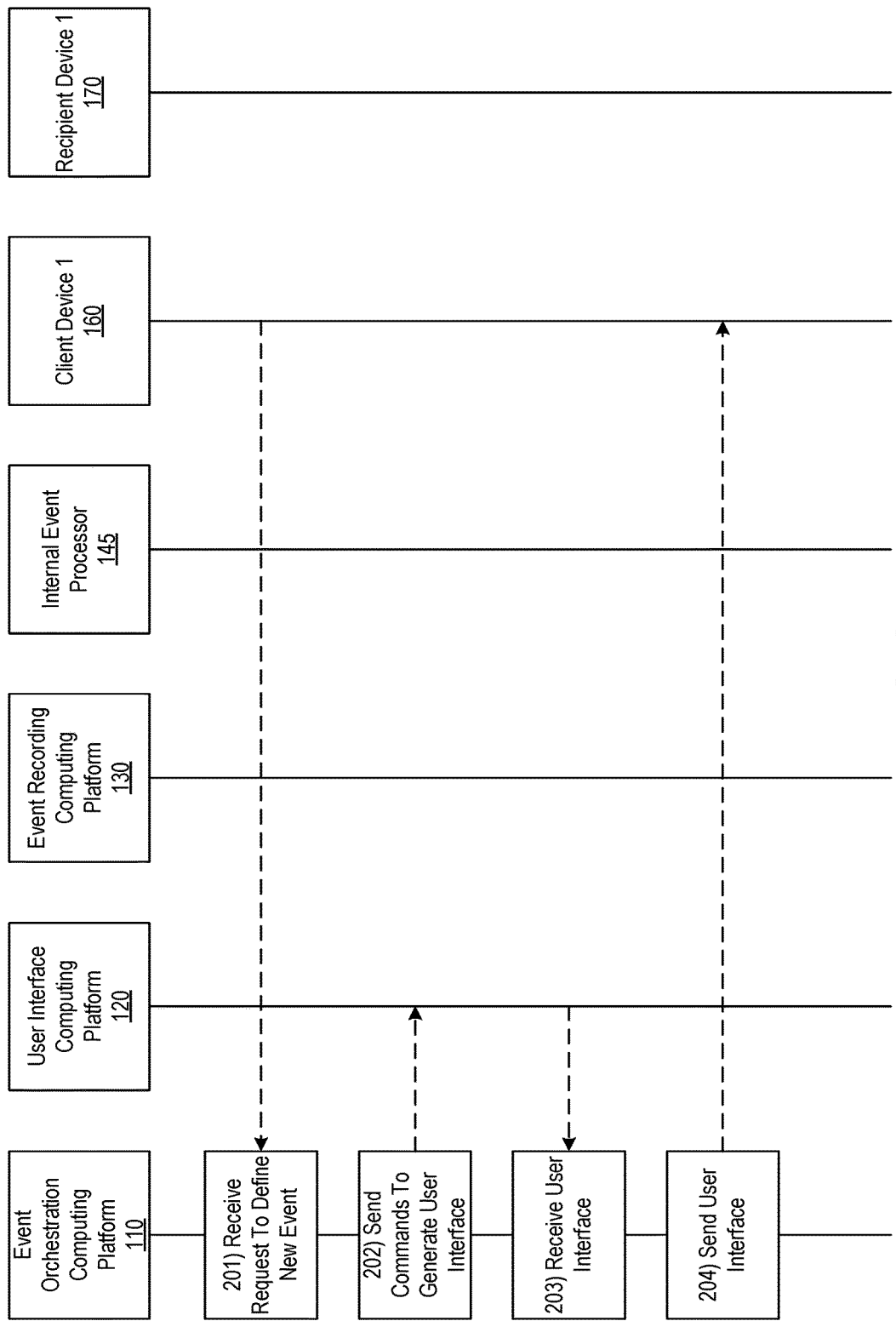

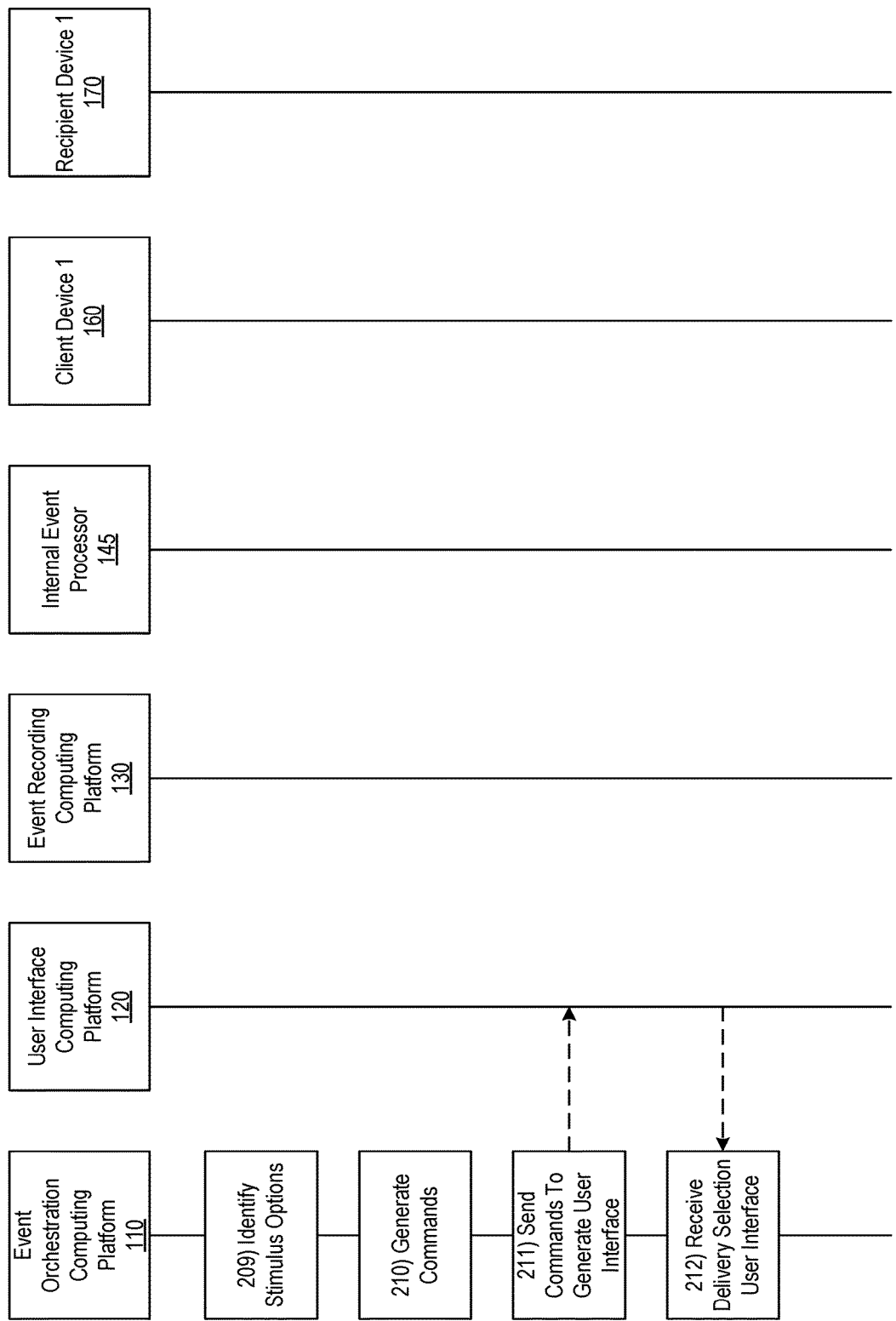

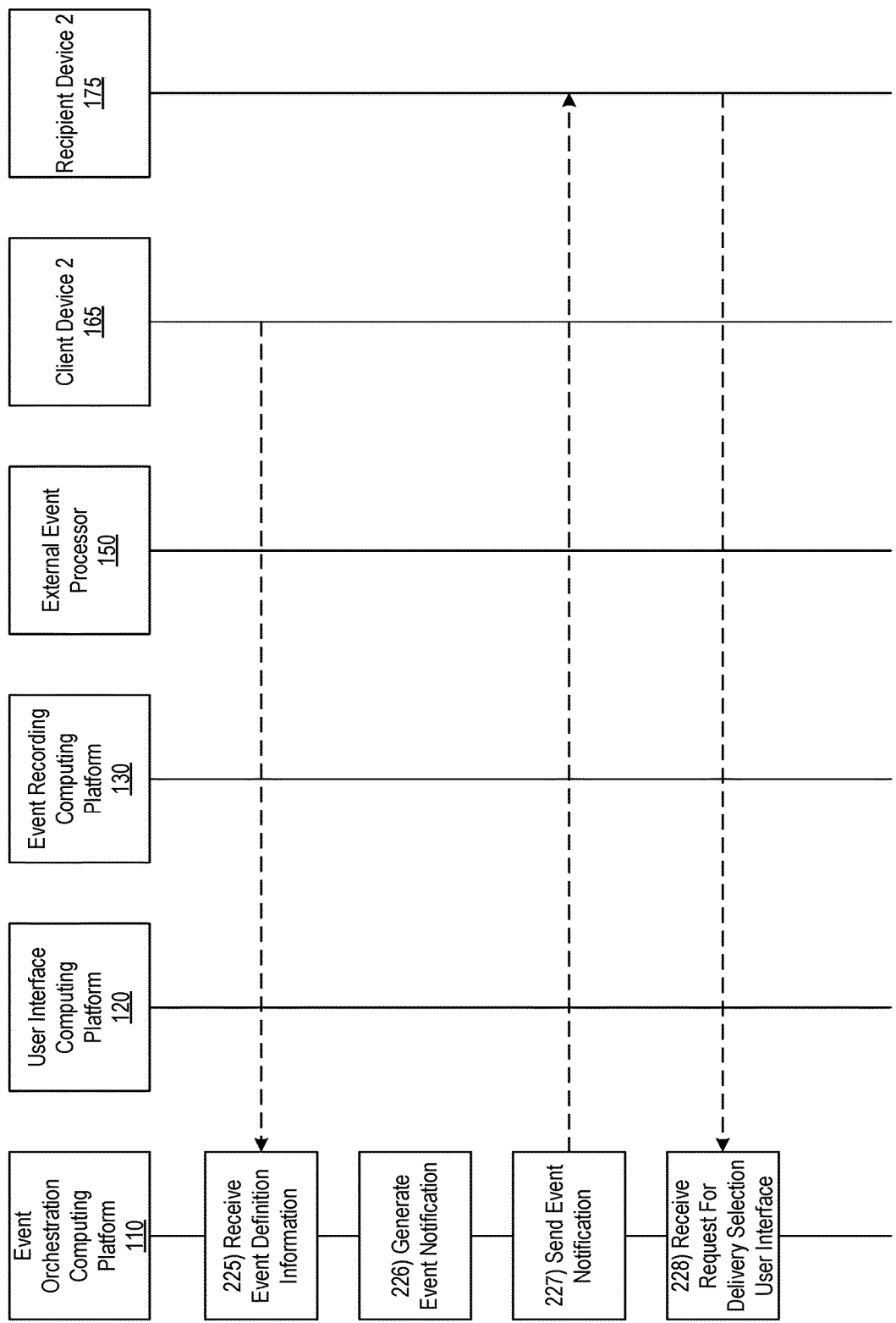

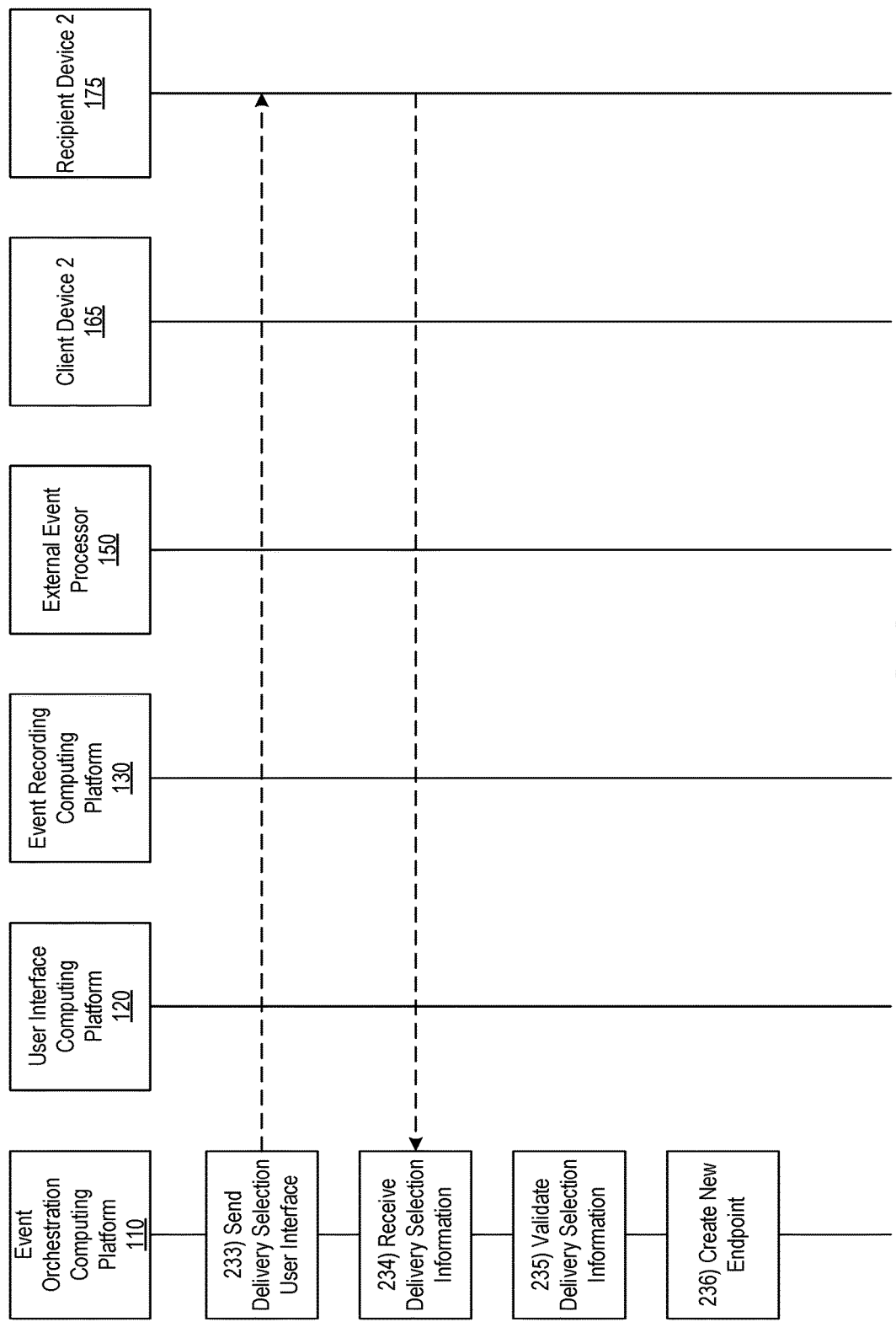

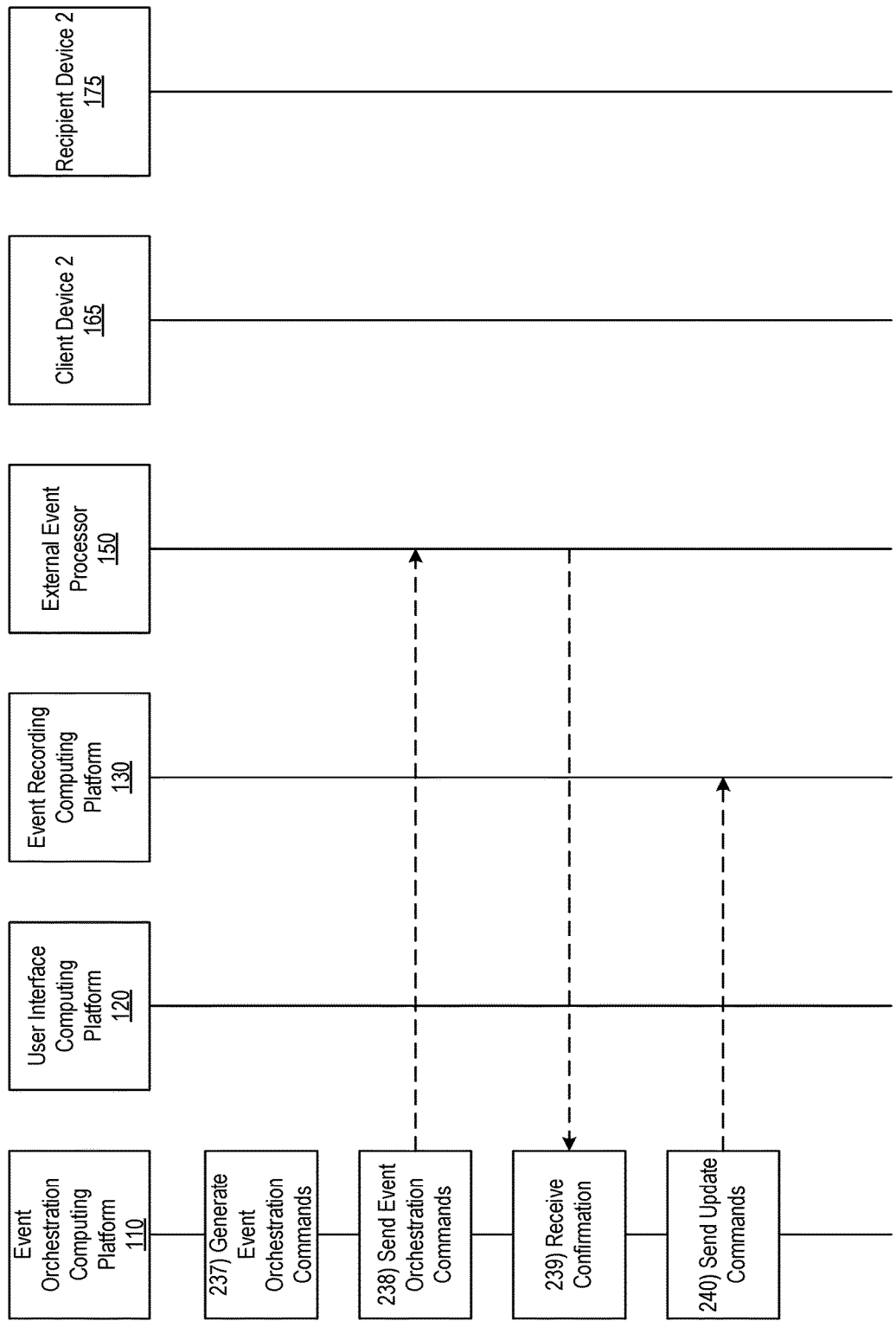

MULTICOMPUTER PROCESSING OF CLIENT DEVICE REQUEST DATA USING CENTRALIZED EVENT ORCHESTRATOR

BACKGROUND

Aspects of the disclosure relate to electrical computers, digital processing systems, and multicomputer data transferring. In particular, one or more aspects of the disclosure relate to multicomputer processing of client device request data using a centralized event orchestrator.

As computer systems are increasingly utilized to provide automated and electronic services, such computer systems may obtain and maintain increasing amounts of various types of sensitive information, and ensuring the safety and security of this information may be increasingly important. In many instances, however, it may be difficult to ensure the safety and security of such information while also optimizing the efficient and effective technical operations of the computer systems that maintain such information and/or provide such automated and electronic services.

SUMMARY

Aspects of the disclosure provide effective, efficient, scalable, and convenient technical solutions that address and overcome the technical problems associated with providing information security and optimizing the efficient and effective technical operations of computer systems. In particular, one or more aspects of the disclosure provide techniques for processing client device request data using multicomputer processing as well as a centralized event orchestrator to improve information security and enhance technical performance.

In accordance with one or more embodiments, a computing platform having at least one processor, a memory, and a communication interface may receive, via the communication interface, from a first client computing device, first event definition information defining a first event, and the first event definition information may include first stimulus selection information associated with the first event. Subsequently, the computing platform may receive, via the communication interface, from a first recipient computing device associated with the first event, a first request for a recipient-selection user interface. Based on receiving the first request for the recipient-selection user interface from the first recipient computing device associated with the first event, the computing platform may identify one or more stimulus options available for a first user of the first recipient computing device associated with the first event based on the first stimulus selection information associated with the first event. Based on identifying the one or more stimulus options available for the first user of the first recipient computing device associated with the first event, the computing platform may send, via the communication interface, to the first recipient computing device associated with the first event, a first delivery selection user interface. In addition, the first delivery selection user interface may include a first user-selectable component that, when invoked, causes the computing platform to create a first new endpoint associated with a first stimulus option of the one or more stimulus options identified as being available for the first user of the first recipient computing device associated with the first event.

Thereafter, the computing platform may receive, via the communication interface, from the first recipient computing device associated with the first event, first delivery selection information. The first delivery selection information may include information indicating that the first user-selectable component has been invoked, and the first delivery selection information may include information identifying the first new endpoint associated with the first stimulus option as a first destination for the first event selected by the first user of the first recipient computing device associated with the first event. Based on receiving the first delivery selection information from the first recipient computing device associated with the first event, the computing platform may generate, based on the first delivery selection information, one or more first event orchestration commands directing an event processor to execute one or more actions associated with the first event. Subsequently, the computing platform may send, via the communication interface, to the event processor, the one or more first event orchestration commands directing the event processor to execute the one or more actions associated with the first event.

In some embodiments, receiving the first event definition information defining the first event may include receiving information defining one or more parameters of the first event from the first client computing device. In some instances, the information defining the one or more parameters of the first event may include information defining the first event as a single event having a single occurrence. In some instances, the information defining the one or more parameters of the first event may include information defining the first event as a recurring event having multiple occurrences.

In some embodiments, the first recipient computing device associated with the first event may be linked to a first alias identified as a recipient in the first event definition information. In some instances, the first alias identified as the recipient in the first event definition information may include an email address. In some instances, the first alias identified as the recipient in the first event definition information may include a mobile telephone number.

In some embodiments, identifying the one or more stimulus options available for the first user of the first recipient computing device associated with the first event comprises identifying at least one stimulus option as available for the first user of the first recipient computing device associated with the first event based on the at least one stimulus option being specified by a user of the first client computing device in the first stimulus selection information associated with the first event.

In some embodiments, the event processor may be an internal event processor operated by an entity operating the computing platform. In some embodiments, the event processor may be an external event processor operated by a third-party entity not associated with an entity operating the computing platform.

In some embodiments, the computing platform may receive, via the communication interface, from a second client computing device, second event definition information defining a second event, and the second event definition information may include second stimulus selection information associated with the second event. Subsequently, the computing platform may receive, via the communication interface, from a second recipient computing device associated with the second event, a second request for a recipient-selection user interface. Based on receiving the second request for the recipient-selection user interface from the second recipient computing device associated with the second event, the computing platform may identify one or more stimulus options available for a second user of the second recipient computing device associated with the second event based on the second stimulus selection information associated with the second event. Based on identifying the one or more stimulus options available for the second user of the second recipient computing device associated with the second event, the computing platform may send, via the communication interface, to the second recipient computing device associated with the second event, a second delivery selection user interface. In addition, the second delivery selection user interface may include a second user-selectable component that, when invoked, causes the computing platform to create a second new endpoint associated with a second stimulus option of the one or more stimulus options identified as being available for the second user of the second recipient computing device associated with the second event.

Thereafter, the computing platform may receive, via the communication interface, from the second recipient computing device associated with the second event, second delivery selection information. The second delivery selection information may include information indicating that the second user-selectable component has been invoked, and the second delivery selection information may include information identifying the second new endpoint associated with the second stimulus option as a second destination for the second event selected by the second user of the second recipient computing device associated with the second event. Based on receiving the second delivery selection information from the second recipient computing device associated with the second event, the computing platform may generate, based on the second delivery selection information, one or more second event orchestration commands directing the event processor to execute one or more actions associated with the second event. Subsequently, the computing platform may send, via the communication interface, to the event processor, the one or more second event orchestration commands directing the event processor to execute the one or more actions associated with the second event.

In some embodiments, receiving the second event definition information defining the second event may include receiving information defining one or more parameters of the second event from the second client computing device. In some instances, the information defining the one or more parameters of the second event may include information defining the second event as a single event having a single occurrence. In some instances, the information defining the one or more parameters of the second event may include information defining the second event as a recurring event having multiple occurrences.

In some embodiments, the second recipient computing device associated with the second event may be linked to a second alias identified as a recipient in the second event definition information. In some instances, the second alias identified as the recipient in the second event definition information may include an email address. In some instances, the second alias identified as the recipient in the second event definition information may include a mobile telephone number.

In some embodiments, identifying the one or more stimulus options available for the second user of the second recipient computing device associated with the second event may include identifying at least one stimulus option as available for the second user of the second recipient computing device associated with the second event based on the at least one stimulus option being specified by a user of the second client computing device in the second stimulus selection information associated with the second event.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for multicomputer processing of client device request data using a centralized event orchestrator in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. Some aspects of the disclosure relate to incentivizing a recipient of a cross-border and/or cross-currency payment to select to receive the payment in non-monetary form (e.g., as a prepaid gift card). The payment may be made to the recipient by an organization, such as a treasury client of a financial institution, which may define the specific incentive(s) to be offered to the recipient. These aspects and other aspects of the disclosure are illustrated in greater detail below.

Figure 1A:
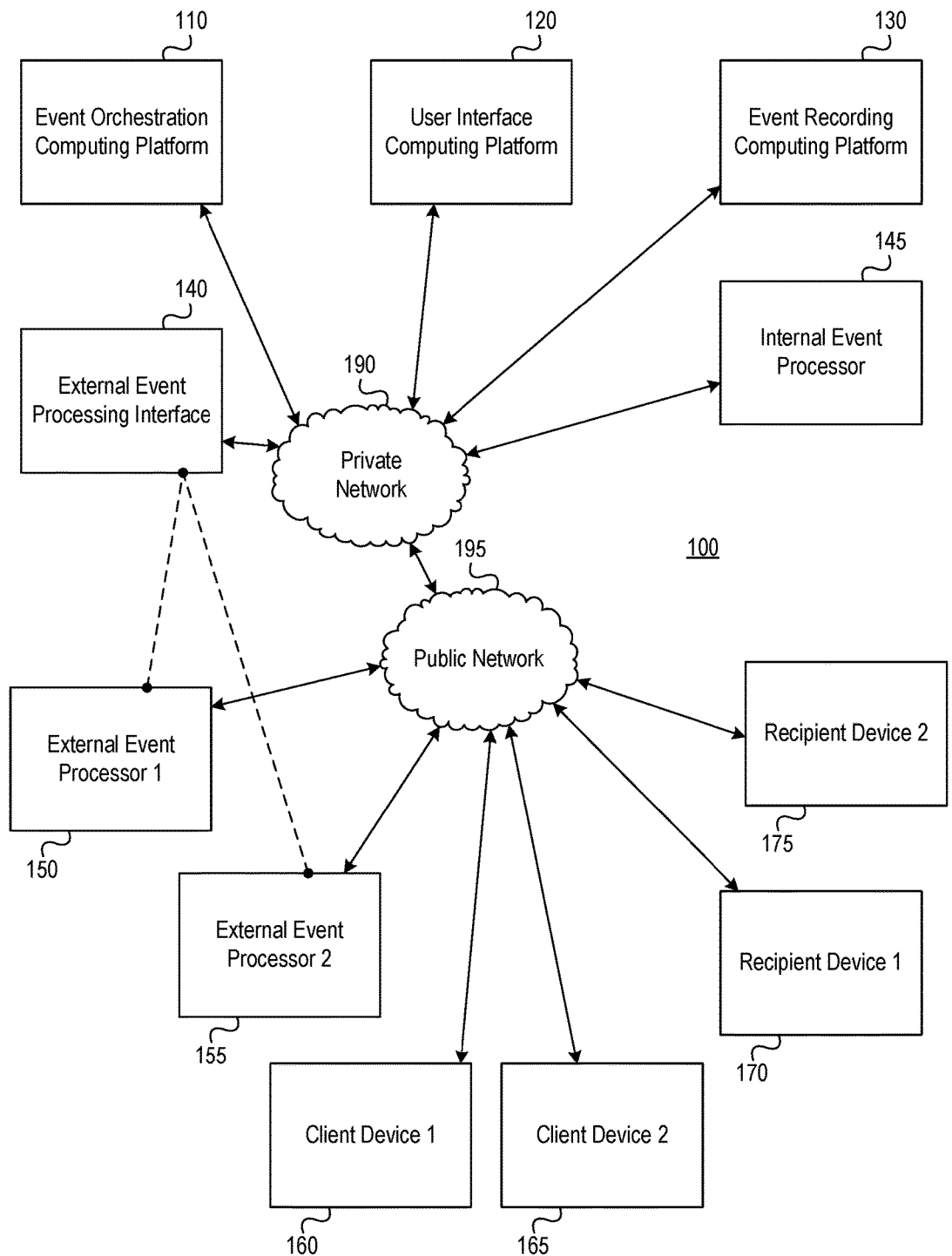
FIGS. 1A and 1B depict an illustrative computing environment for multicomputer processing of client device request data using a centralized event orchestrator in accordance with one or more example embodiments.
Figure 1B:
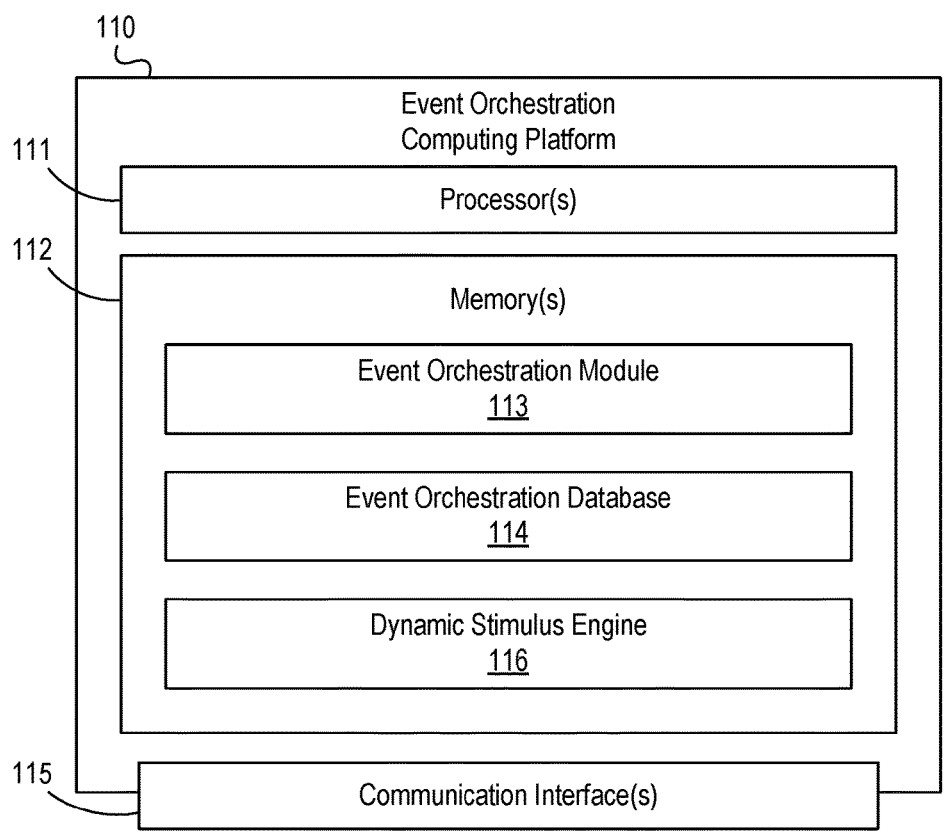

FIGS. 1A and 1B depict an illustrative computing environment for multicomputer processing of client device request data using a centralized event orchestrator in accordance with one or more example embodiments. Referring to FIG. 1A, computing environment 100 may include one or more computing devices and/or other computer systems. For example, computing environment 100 may include an event orchestration computing platform 110, a user interface computing platform 120, an event recording computing platform 130, an external event processing interface 140, an internal event processor 145, a first external event processor 150, a second external event processor 155, a first client computing device 160, a second client computing device 165, a first recipient computing device 170, and a second recipient computing device 175.

Event orchestration computing platform 110 may be configured to orchestrate events that are defined and/or requested by one or more client devices, control and/or direct actions of other devices and/or computer systems (e.g., in orchestrating events that are defined and/or requested by one or more client devices and/or in performing other actions), and/or perform other functions, as discussed in greater detail below. In some instances, event orchestration computing platform 110 may perform and/or provide one or more transaction processing functions, risk analysis functions, and/or other related functions.

User interface computing platform 120 may be configured to generate one or more user interfaces that are provided to other computer systems and/or devices in computing environment 100, including client computing device 160, client computing device 165, recipient computing device 170, and recipient computing device 175. In some instances, the one or more user interfaces that are generated by user interface computing platform 120 may be served to such other computer systems and/or devices by event orchestration computing platform 110, as illustrated in greater detail below. Event recording computing platform 130 may be configured to store, maintain, and/or update one or more records associated with one or more events occurring in computing environment 100, including one or more events orchestrated by event orchestration computing platform 110 and/or otherwise associated with event orchestration computing platform 110.

External event processing interface 140 may be configured to facilitate processing of one or more events that are orchestrated by event orchestration computing platform 110 and/or otherwise associated with event orchestration computing platform 110 and that may be performed by and/or involve one or more external event processors, such as external event processor 150 and external event processor 155. For example, event orchestration computing platform 110 may be operated by and/or otherwise associated with a particular organization (e.g., a financial institution) and may, in some instances, be configured to orchestrate and/or control one or more events (e.g., payments transactions, including cross-border payment transactions and/or cross-currency payment transactions). In addition, external event processor 150 and external event processor 155 may, for example, be operated by and/or otherwise associated with one or more other organizations (e.g., payment processors, credit networks, debit networks, digital wallet services, and/or the like) different from the particular organization operating event orchestration computing platform 110 (e.g., different from the financial institution operating event orchestration computing platform 110). In some instances, external event processing interface 140 may be provided with and/or include one or more dedicated communication links and/or dedicated communication channels, which may directly and/or securely connect external event processing interface 140 to the one or more external event processors, including external event processor 150 and/or external event processor 155.

Internal event processor 145 may be operated by and/or configured to process events associated with the same organization that may operate event orchestration computing platform 110. For example, internal event processor 145 may support operations of and/or be associated with a credit network provided by the organization operating event orchestration computing platform 110, a debit network provided by the organization operating event orchestration computing platform 110, and/or a digital wallet service provided by the organization operating event orchestration computing platform 110. In addition, payment transactions and/or other events orchestrated by event orchestration computing platform 110 that involve transfers of funds between accounts maintained by the organization operating event orchestration computing platform 110, other actions performed with respect to accounts maintained by the organization operating event orchestration computing platform 110, and/or other intra-organization events orchestrated by event orchestration computing platform 110, may be processed by internal event processor 145, as illustrated in greater detail below. In some instances, when processing cross-border and/or cross-currency payment transactions and/or other events orchestrated by event orchestration computing platform 110, internal event processor 145 may perform and/or provide one or more currency exchange functions, accounting functions, compliance functions, and/or the like.

External event processor 150 may be operated by and/or configured to process events associated with a first service provider or entity (e.g., different from the organization operating event orchestration computing platform 110), such as a payment processor, a credit network, a debit network, a digital wallet service, and/or the like. External event processor 155 may be operated by and/or configured to process events associated with a second service provider or entity (e.g., different from the organization operating event orchestration computing platform 110), such as a payment processor, a credit network, a debit network, a digital wallet service, and/or the like, different from the first service provider. For example, external event processor 150 may be associated with a first payment services provider or digital wallet service operating in a first country and/or maintaining funds in a first currency, and external event processor 155 may be associated with a second payment services provider or digital wallet service operating in a second country and/or maintaining funds in a second currency. In some instances, when processing cross-border and/or cross-currency payment transactions and/or other events orchestrated by event orchestration computing platform 110, external event processor 150 and/or external event processor 155 may perform and/or provide one or more currency exchange functions, accounting functions, compliance functions, and/or the like.

Client computing device 160 may be configured to be used by a first customer of an organization, such as an individual client or personal banking customer of a financial institution, or a commercial client or treasury client of a financial institution. In some instances, client computing device 160 may, for example, be registered with the organization and/or one or more computer systems in computing environment 100, such that the organization and/or the one or more computer systems maintain one or more records linking client computing device 160 to the first customer of the organization. Client computing device 165 may be configured to be used by a second customer of the organization (which may, e.g., be different from the first customer of the organization). In some instances, client computing device 165 may, for example, be registered with the organization and/or one or more computer systems in computing environment 100, such that the organization and/or the one or more computer systems maintain one or more records linking client computing device 165 to the second customer of the organization.

Recipient computing device 170 may be configured to be used by a first recipient associated with an event, such as a first recipient of funds associated with a first payment transaction event. Recipient computing device 175 may be configured to be used by a second recipient associated with an event, such as a second recipient of funds associated with a second payment transaction event.

In one or more arrangements, user interface computing platform 120, event recording computing platform 130, external event processing interface 140, internal event processor 145, external event processor 150, external event processor 155, client computing device 160, client computing device 165, recipient computing device 170, and recipient computing device 175 may be any type of computing device capable of receiving a user interface, receiving input via the user interface, and communicating the received input to one or more other computing devices. For example, user interface computing platform 120, event recording computing platform 130, external event processing interface 140, internal event processor 145, external event processor 150, external event processor 155, client computing device 160, client computing device 165, recipient computing device 170, and recipient computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user interface computing platform 120, event recording computing platform 130, external event processing interface 140, internal event processor 145, external event processor 150, external event processor 155, client computing device 160, client computing device 165, recipient computing device 170, and recipient computing device 175 may, in some instances, be special-purpose computing devices configured to perform specific functions.

Computing environment 100 also may include one or more computing platforms. For example, and as noted above, computing environment 100 may include event orchestration computing platform 110. As illustrated in greater detail below, event orchestration computing platform 110 may include one or more computing devices configured to perform one or more of the functions described herein. For example, event orchestration computing platform 110 may include one or more computers (e.g., laptop computers, desktop computers, servers, server blades, or the like).

Computing environment 100 also may include one or more networks, which may interconnect one or more of event orchestration computing platform 110, user interface computing platform 120, event recording computing platform 130, external event processing interface 140, internal event processor 145, external event processor 150, external event processor 155, client computing device 160, client computing device 165, recipient computing device 170, and recipient computing device 175. For example, computing environment 100 may include private network 190 and public network 195. Private network 190 and/or public network 195 may include one or more sub-networks (e.g., local area networks (LANs), wide area networks (WANs), or the like). Private network 190 may be associated with a particular organization (e.g., a corporation, financial institution, educational institution, governmental institution, or the like) and may interconnect one or more computing devices associated with the organization. For example, event orchestration computing platform 110, user interface computing platform 120, event recording computing platform 130, external event processing interface 140, and internal event processor 145 may be associated with an organization (e.g., a financial institution), and private network 190 may be associated with and/or operated by the organization, and may include one or more networks (e.g., LANs, WANs, virtual private networks (VPNs), or the like) that interconnect event orchestration computing platform 110, user interface computing platform 120, event recording computing platform 130, external event processing interface 140, internal event processor 145, and one or more other computing devices and/or computer systems that are used by, operated by, and/or otherwise associated with the organization. Public network 195 may connect private network 190 and/or one or more computing devices connected thereto (e.g., event orchestration computing platform 110, user interface computing platform 120, event recording computing platform 130, external event processing interface 140, internal event processor 145) with one or more networks and/or computing devices that are not associated with the organization. For example, external event processor 150, external event processor 155, client computing device 160, client computing device 165, recipient computing device 170, and recipient computing device 175 might not be, associated with an organization that operates private network 190 (e.g., because external event processor 150, external event processor 155, client computing device 160, client computing device 165, recipient computing device 170, and recipient computing device 175 may be owned, operated, and/or serviced by one or more entities different from the organization that operates private network 190, such as one or more customers of the organization and/or vendors of the organization, rather than being owned and/or operated by the organization itself or an employee or affiliate of the organization), and public network 195 may include one or more networks (e.g., the internet) that connect external event processor 150, external event processor 155, client computing device 160, client computing device 165, recipient computing device 170, and recipient computing device 175 to private network 190 and/or one or more computing devices connected thereto (e.g., event orchestration computing platform 110, user interface computing platform 120, event recording computing platform 130, external event processing interface 140, internal event processor 145).

Referring to FIG. 1B, event orchestration computing platform 110 may include one or more processors 111, memory 112, and communication interface 115. A data bus may interconnect processor(s) 111, memory 112, and communication interface 115. Communication interface 115 may be a network interface configured to support communication between event orchestration computing platform 110 and one or more networks (e.g., private network 190, public network 195, or the like). Memory 112 may include one or more program modules having instructions that when executed by processor(s) 111 cause event orchestration computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event orchestration computing platform 110 and/or by different computing devices that may form and/or otherwise make up event orchestration computing platform 110. For example, memory 112 may have, store, and/or include an event orchestration module 113, an event orchestration database 114, and a dynamic stimulus engine 116. Event orchestration module 113 may have instructions that direct and/or cause event orchestration computing platform 110 to orchestrate one or more events involving one or more other computing devices and/or computer systems in computing environment 100 and/or perform other functions, as discussed in greater detail below. Event orchestration database 114 may store information used by event orchestration module 113 and/or event orchestration computing platform 110 in orchestrating one or more events involving one or more other computing devices and/or computer systems in computing environment 100 and/or in performing other functions. Dynamic stimulus engine 116 may have instructions that direct and/or cause event orchestration computing platform 110 to evaluate and/or determine, in real-time and/or on a continuous basis, whether a dynamic stimulus option is available during orchestration of a particular event, present one or more graphical user interfaces and/or interface elements associated with a dynamic stimulus option, dynamically create one or more new endpoints based on activation and/or invocation of a dynamic stimulus option during orchestration of a particular event, and/or perform other functions.

Figure 2B:
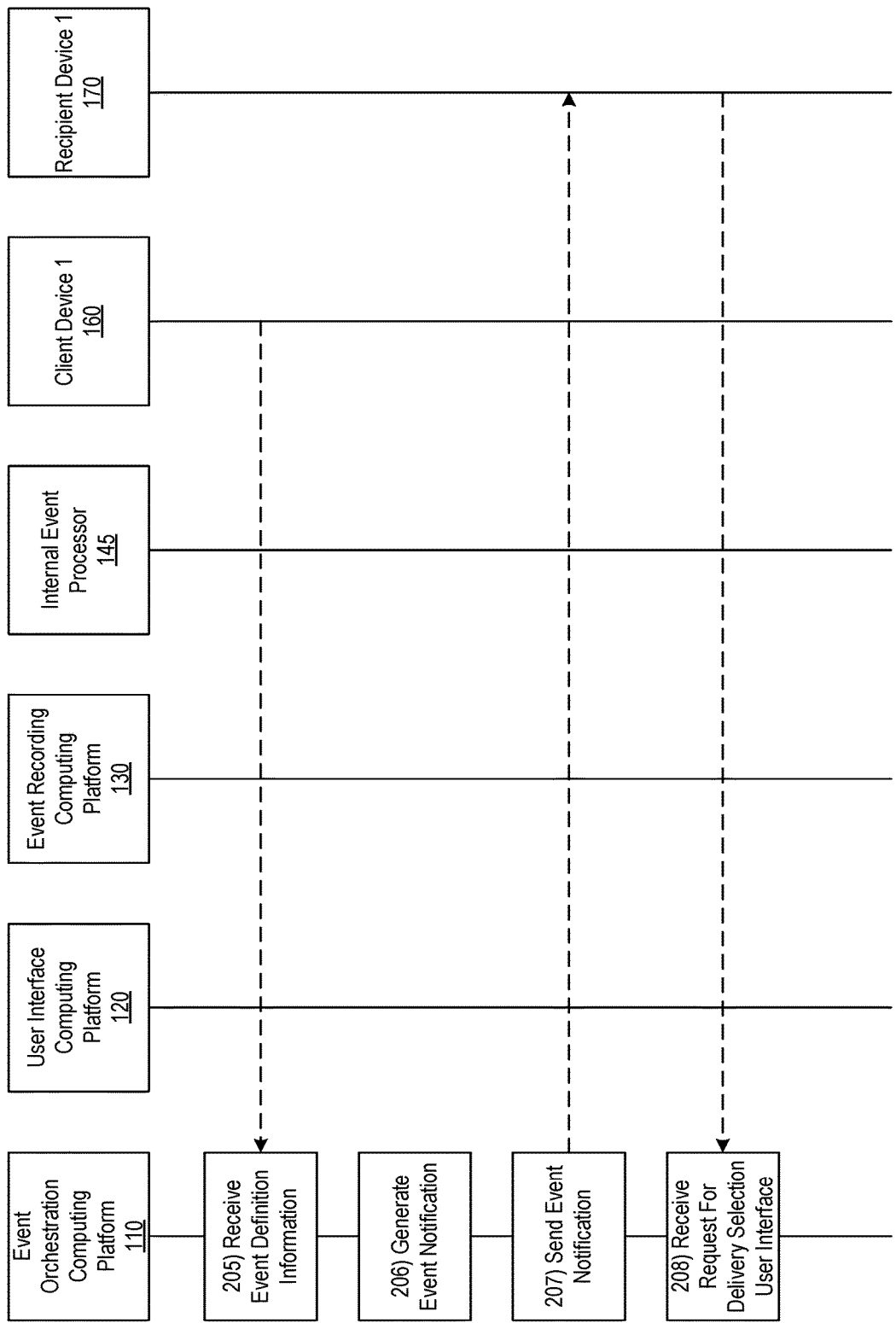

FIGS. 2A-2J depict an illustrative event sequence for multicomputer processing of client device request data using a centralized event orchestrator in accordance with one or more example embodiments. Referring to FIG. 2A, at step 201, event orchestration computing platform 110 may receive a request to define a new event from client computing device 160. For example, at step 201, event orchestration computing platform 110 may receive a message from client computing device 160 requesting an event definition user interface and/or other user interface via which a new event and/or one or more associated event parameters may be defined.

In some instances, the request to define a new event received from client computing device 160 at step 201 may be and/or include a request to define a new payment transaction event, such as a cross-border and/or cross-currency payment transaction event, to be orchestrated by event orchestration computing platform 110. For instance, event orchestration computing platform 110 may be operated by and/or associated with a financial institution, and client computing device 160 may be operated by and/or associated with an individual client of the financial institution or a treasury client of the financial institution. The client of the financial institution associated with client computing device 160 may, for instance, request to define a new payment transaction event, such as a cross-border and/or cross-currency payment transaction event, that is to be orchestrated by event orchestration computing platform 110 and that may involve a payment by the client of the financial institution to a specific recipient (which may, e.g., be associated with a specific recipient device, such as recipient computing device 170). As illustrated in greater detail below, the client of the financial institution may identify the specific recipient of the new payment transaction event only by an alias, such as an email address, a mobile telephone number, a social networking handle, and/or the like (e.g., rather than identifying the specific recipient of the new payment transaction event by a legal name and/or account number), and event orchestration computing platform 110 may use this alias information to contact the specific recipient of the new payment transaction event and provide them with recipient-selection functionality that allows the specific recipient of the new payment transaction event to select how they would like to receive the funds corresponding to the new payment transaction event (e.g., in a particular digital wallet, bank account, and/or the like). In addition, the new payment transaction event may, in some instances, be a cross-border payment transaction event in which the client of the financial institution and the specific recipient of the new payment transaction may be located in and/or otherwise be associated with different countries. Additionally or alternatively, the new payment transaction event may, in some instances, be a cross-currency payment transaction event in which the client of the financial institution may provide funds to the financial institution for payment in a first currency, and in which the specific recipient of the new payment transaction may receive the funds in a second currency different from the first currency.

At step 202, event orchestration computing platform 110 may send one or more commands to user interface computing platform 120 directing user interface computing platform 120 to generate a user interface. For example, at step 202, event orchestration computing platform 110 may generate and/or send one or more commands to user interface computing platform 120 directing user interface computing platform 120 to generate a user interface that is configured to allow a user of client computing device 160 to define a new event, such as a new cross-border and/or cross-currency payment transaction event, to be orchestrated by event orchestration computing platform 110. The one or more commands generated by event orchestration computing platform 110 and/or sent by event orchestration computing platform 110 to user interface computing platform 120 may include parameters and/or other information identifying a client of an organization operating event orchestration computing platform 110 with which the request to define the new event is associated (e.g., the client of the organization linked to and/or otherwise associated with client computing device 160), parameters and/or other information identifying the user interface that is requested, and/or other parameters and information. At step 203, event orchestration computing platform 110 may receive a user interface generated by user interface computing platform 120 from user interface computing platform 120. For example, at step 203, event orchestration computing platform 110 may receive from user interface computing platform 120 a user interface generated by user interface computing platform 120 based on the one or more commands sent to user interface computing platform 120 by event orchestration computing platform 110.

Figure 3:
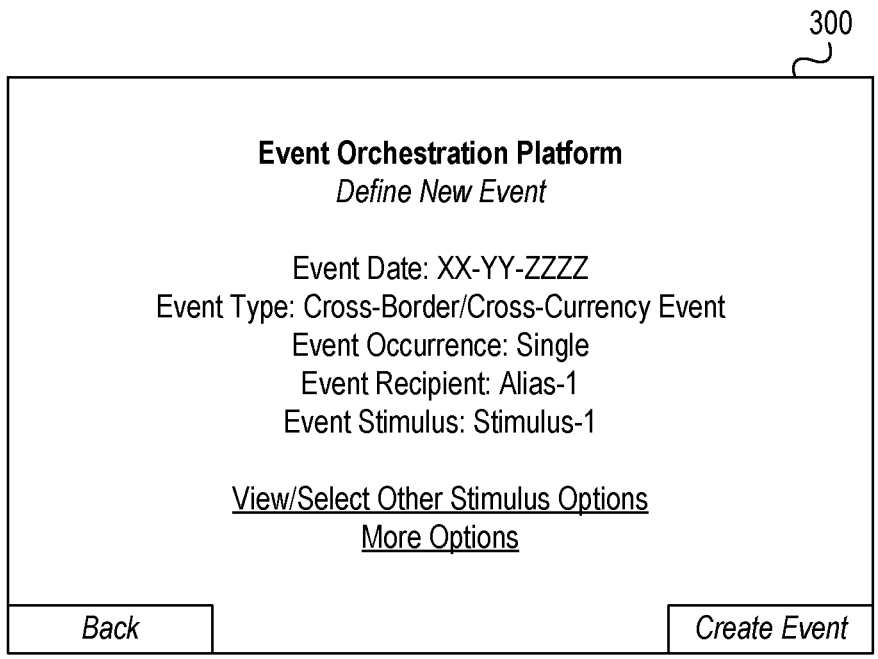
FIGS. 3-6 depict example graphical user interfaces for multicomputer processing of client device request data using a centralized event orchestrator in accordance with one or more example embodiments.

At step 204, event orchestration computing platform 110 may send the user interface to client computing device 160. In sending the user interface to client computing device 160, event orchestration computing platform 110 may cause client computing device 160 to display and/or otherwise present the user interface generated by user interface computing platform 120 based on the one or more commands sent to user interface computing platform 120 by event orchestration computing platform 110. For example, in sending the user interface to client computing device 160, event orchestration computing platform 110 may cause client computing device 160 to display and/or otherwise present a graphical user interface similar to graphical user interface 300, which is illustrated in FIG. 3. As seen in FIG. 3, graphical user interface 300 may include one or more fields, controls, and/or other elements that may allow a user of client computing device 160 to define a new event, such as a new cross-border and/or cross-currency payment transaction event, to be orchestrated by event orchestration computing platform 110. For example, graphical user interface 300 may include one or more fields, controls, and/or other elements that may allow a user of client computing device 160 to specify and/or otherwise define an event date parameter associated with the new event, an event type parameter associated with the new event, an event occurrence parameter associated with the new event, an event recipient parameter associated with the new event, an event stimulus parameter associated with the new event, and/or other parameters associated with the new event.

In addition, and as seen in FIG. 3, graphical user interface 300 may include one or more fields, controls, and/or other elements that may allow a user of client computing device 160 to identify a recipient associated with the event using an alias, such as an email address, a mobile telephone number, a social networking handle, and/or the like (e.g., rather than identifying the recipient of the new event by a legal name and/or account number), and event orchestration computing platform 110 subsequently may use this alias information to contact the specific recipient of the new event and provide them with recipient-selection functionality (which may, e.g., allow the specific recipient of a new payment transaction event to select how they would like to receive the funds corresponding to the new payment transaction event, such as in a particular digital wallet, bank account, and/or the like). Graphical user interface 300 also may include one or more fields, controls, and/or other elements that may allow a user of client computing device 160 to view and/or select various stimulus options that may be available in connection with a new event (e.g., "View/Select Other Stimulus Options"). Such other stimulus options that may be available in connection with the new event may, for example, include one or more stimulus options that are designed to incentivize a recipient of the new event to select to receive funds associated with the new event via a particular delivery method, such as in a new account maintained by a financial institution operating event orchestration computing platform 110 or a different financial institution, via a prepaid debit card usable via one or more debit networks, via a gift card that is redeemable with and/or otherwise usable with a merchant client or other treasury client defining the new event, and/or the like.

Referring to FIG. 2B, at step 205, event orchestration computing platform 110 may receive event definition information from client computing device 160, and the event definition information received by event orchestration computing platform 110 from client computing device 160 may, in some instances, include stimulus selection information specified by a user of client computing device 160. For example, at step 205, event orchestration computing platform 110 may receive, via the communication interface (e.g., communication interface 115), from a first client computing device (e.g., client computing device 160), first event definition information defining a first event, and the first event definition information may include first stimulus selection information associated with the first event. The first event definition information defining the first event to be orchestrated by event orchestration computing platform 110 and the first stimulus selection information associated with the first event may, for instance, be received via an event definition user interface generated by user interface computing platform 120 and sent to client computing device 160 by event orchestration computing platform 110 (e.g., the user interface sent by event orchestration computing platform 110 to client computing device 160 at step 204). In addition, the first stimulus selection information associated with the first event may, for example, identify one or more specific stimulus options specified by the user of client computing device 160 to be offered to the recipient of the new event as incentives to receive funds associated with the new event via a particular delivery method corresponding to the one or more specific stimulus options specified by the user of client computing device 160. For example, the first stimulus selection information associated with the first event may, for example, identify and/or specify that the recipient of the new event should be prompted to select whether to receive funds associated with the new event in a new account maintained by a financial institution operating event orchestration computing platform 110 or a different financial institution, via a prepaid debit card usable via one or more debit networks, via a gift card that is redeemable with and/or otherwise usable with a merchant client or other treasury client using client computing device 160 to define the new event, and/or via one or more other delivery methods associated with other stimulus options.

In some embodiments, receiving the first event definition information defining the first event may include receiving information defining one or more parameters of the first event from the first client computing device. For example, in receiving the first event definition information defining the first event, event orchestration computing platform 110 may receive information defining one or more parameters of the first event from the first client computing device (e.g., client computing device 160). For example, the first event definition information defining the first event to be orchestrated by event orchestration computing platform 110 (which may, e.g., be received by event orchestration computing platform 110 from client computing device 160 at step 205) may include one or more parameters and/or other information specified by a user of client computing device 160. For example, the first event to be orchestrated by event orchestration computing platform 110 may be a payment transaction, and the one or more parameters and/or other information specified by the user of client computing device 160 may identify a recipient of the transaction to be paid, an amount to be paid to the recipient of the transaction, whether the transaction has a single occurrence or multiple occurrences, and/or other characteristics of the transaction.

In some embodiments, the information defining the one or more parameters of the first event may include information defining the first event as a single event having a single occurrence. For example, the information defining the one or more parameters of the first event (which may, e.g., be received by event orchestration computing platform 110 from client computing device 160) may include information defining the first event as a single event having a single occurrence. For instance, the first event may correspond to a new payment transaction involving a single payment to an identified recipient. In some embodiments, the information defining the one or more parameters of the first event may include information defining the first event as a recurring event having multiple occurrences. For example, the information defining the one or more parameters of the first event (which may, e.g., be received by event orchestration computing platform 110 from client computing device 160) may include information defining the first event as a recurring event having multiple occurrences. For instance, the first event may correspond to a new payment transaction involving multiple recurring payments to an identified recipient.

At step 206, event orchestration computing platform 110 may generate an event notification. For example, at step 206, event orchestration computing platform 110 may generate an event notification for recipient computing device 170 based on receiving event definition information from client computing device 160 identifying an alias linked to recipient computing device 170 as a recipient associated with the event defined by the event definition information received from client computing device 160. At step 207, event orchestration computing platform 110 may send the event notification to recipient computing device 170. In sending the event notification to recipient computing device 170, event orchestration computing platform 110 may, for instance, send the event notification to recipient computing device 170 via a push notification service associated with an operating system executing on recipient computing device 170. Additionally or alternatively, in sending the event notification to recipient computing device 170, event orchestration computing platform 110 may send an electronic mail message, a short message service message, and/or another type of electronic message to recipient computing device 170.

At step 208, event orchestration computing platform 110 may receive a request for a delivery selection user interface (which may, e.g., also be referred to as a recipient-selection user interface) from recipient computing device 170. For example, at step 208, event orchestration computing platform 110 may receive, via the communication interface (e.g., communication interface 115), from a first recipient computing device associated with the first event (e.g., recipient computing device 170), a first request for a recipient-selection user interface. For instance, event orchestration computing platform 110 may receive such a request after recipient computing device 170 sends the request in response to receiving a selection or other user input in response to presenting the event notification received from event orchestration computing platform 110.

In some embodiments, the first recipient computing device associated with the first event may be linked to a first alias identified as a recipient in the first event definition information. For example, the first recipient computing device associated with the first event (e.g., recipient computing device 170) may be linked to a first alias identified as a recipient in the first event definition information (which may, e.g., be received by event orchestration computing platform 110 from client computing device 160). In some instances, the first alias identified as the recipient in the first event definition information (which may, e.g., be received by event orchestration computing platform 110 from client computing device 160) may include an email address. For example, the first alias identified as the recipient in the first event definition information received by event orchestration computing platform 110 from client computing device 160 may include an email address that is linked to, registered with, and/or otherwise associated with the first recipient computing device associated with the first event (e.g., recipient computing device 170) as an alias of the first recipient computing device associated with the first event (e.g., recipient computing device 170). Additionally or alternatively, the first alias identified as the recipient in the first event definition information (which may, e.g., be received by event orchestration computing platform 110 from client computing device 160) may include a mobile telephone number. For example, the first alias identified as the recipient in the first event definition information received by event orchestration computing platform 110 from client computing device 160 may include a mobile telephone number that is linked to, registered with, and/or otherwise associated with the first recipient computing device associated with the first event (e.g., recipient computing device 170) as an alias of the first recipient computing device associated with the first event (e.g., recipient computing device 170).

Referring to FIG. 2C, at step 209, event orchestration computing platform 110 may identify one or more stimulus options available for a user of recipient computing device 170. For example, at step 209, based on receiving the first request for the recipient-selection user interface from the first recipient computing device associated with the first event (e.g., recipient computing device 170), event orchestration computing platform 110 may identify one or more stimulus options available for a first user of the first recipient computing device associated with the first event (e.g., recipient computing device 170) based on the first stimulus selection information associated with the first event. In identifying the one or more stimulus options available for the first user of the first recipient computing device associated with the first event (e.g., recipient computing device 170), event orchestration computing platform 110 may, for example, select one or more stimulus options to be offered to the first user of the first recipient computing device associated with the first event (e.g., recipient computing device 170) based on the stimulus selection information associated with the first event received from client computing device 160, based on user profile information corresponding to the recipient and/or another user of recipient computing device 170, and/or other factors. For example, certain stimulus options may be available to a particular user or a particular group of users, and other, different stimulus options may be available to a different user or a different group of users.

In some embodiments, identifying the one or more stimulus options available for the first user of the first recipient computing device associated with the first event may include identifying at least one stimulus option as available for the first user of the first recipient computing device associated with the first event based on the at least one stimulus option being specified by a user of the first client computing device in the first stimulus selection information associated with the first event. For example, in identifying the one or more stimulus options available for the first user of the first recipient computing device associated with the first event (e.g., recipient computing device 170), event orchestration computing platform 110 may identify at least one stimulus option as available for the first user of the first recipient computing device associated with the first event (e.g., recipient computing device 170) based on the at least one stimulus option being specified by a user of the first client computing device (e.g., client computing device 160) in the first stimulus selection information associated with the first event. For instance, event orchestration computing platform 110 may identify and/or otherwise select one or more particular stimulus options to be offered that were specified by the user of client computing device 160 in the event definition information for the particular event received by event orchestration computing platform 110 from client computing device 160.

At step 210, event orchestration computing platform 110 may generate one or more commands directing user interface computing platform 120 to generate a delivery selection user interface. For example, at step 210, event orchestration computing platform 110 may generate one or more commands directing user interface computing platform 120 to generate a delivery selection user interface for recipient computing device 170 that includes a dynamic stimulus option (e.g., based on identifying the one or more stimulus options available for the user of recipient computing device 170). For instance, the one or more commands generated by event orchestration computing platform 110 may direct user interface computing platform 120 to insert and/or include one or more controls and/or other user interface elements in the delivery selection user interface that are configured to offer and/or otherwise provide the one or more stimulus options that were identified and/or otherwise selected by event orchestration computing platform 110 for the user of recipient computing device 170. At step 211, event orchestration computing platform 110 may send the one or more commands to user interface computing platform 120 directing user interface computing platform 120 to generate a delivery selection user interface. For example, at step 211, event orchestration computing platform 110 may send, via the communication interface (e.g., communication interface 115), to a user interface computing platform (e.g., user interface computing platform 120), one or more commands directing the user interface computing platform (e.g., user interface computing platform 120) to generate the delivery selection user interface. The one or more commands generated by event orchestration computing platform 110 and/or sent by event orchestration computing platform 110 to user interface computing platform 120 may include parameters and/or other information identifying the first recipient computing device associated with the first event (e.g., recipient computing device 170) and/or the entity identified as the recipient for the first event (e.g., a registered and/or authorized user of recipient computing device 170), parameters and/or other information identifying the user interface that is requested (e.g., one or more parameters directing and/or causing user interface computing platform 120 to include the identified stimulus options in the delivery selection user interface), and/or other parameters and information.

At step 212, event orchestration computing platform 110 may receive a delivery selection user interface generated by user interface computing platform 120 from user interface computing platform 120. For example, at step 212, event orchestration computing platform 110 may receive, via the communication interface (e.g., communication interface 115), from the user interface computing platform (e.g., user interface computing platform 120), the delivery selection user interface. For instance, at step 212, event orchestration computing platform 110 may receive from user interface computing platform 120 a user interface generated by user interface computing platform 120 based on the one or more commands sent to user interface computing platform 120 by event orchestration computing platform 110.

Figure 2D:
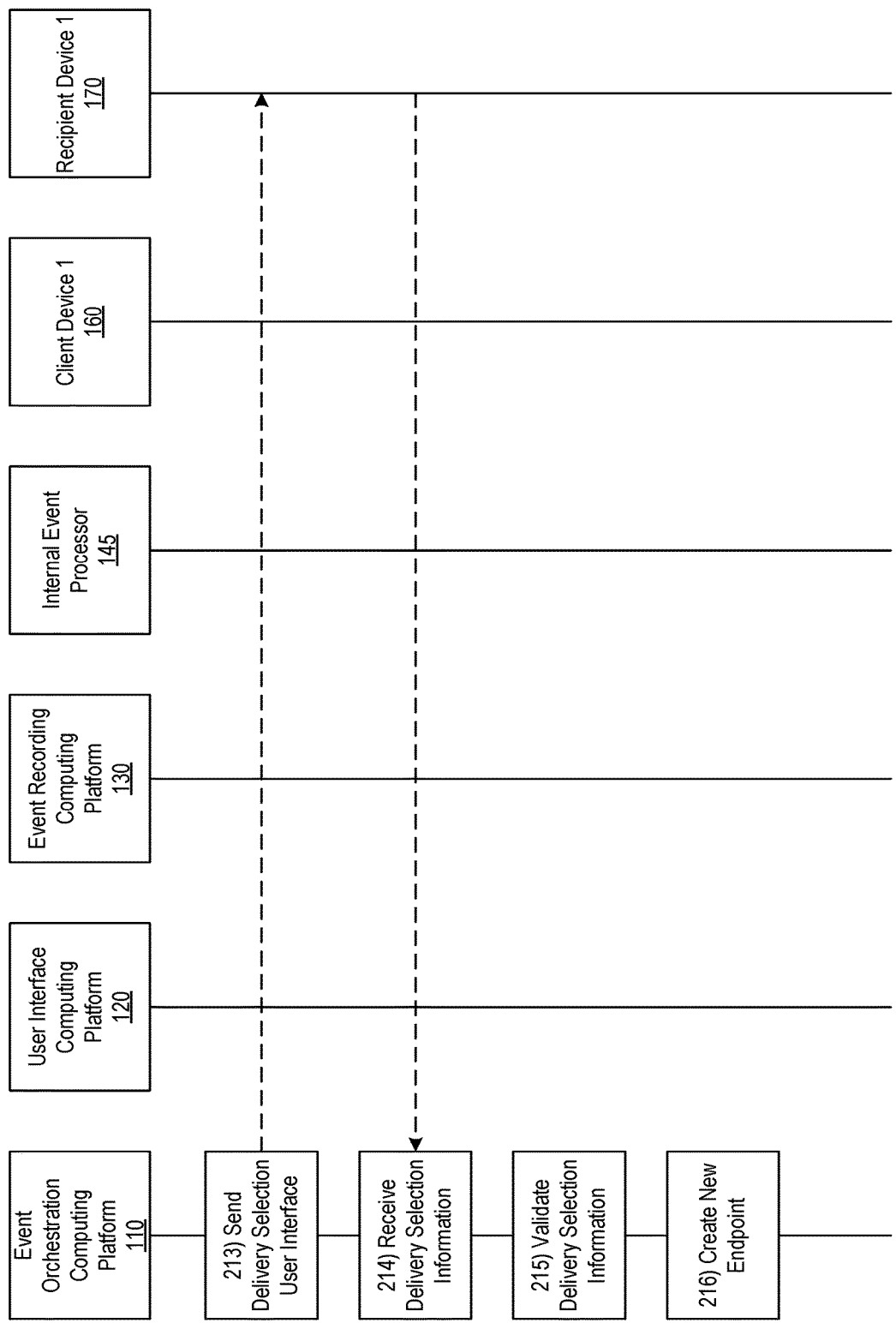

Referring to FIG. 2D, at step 213, event orchestration computing platform 110 may send the delivery selection user interface generated by user interface computing platform 120 to recipient computing device 170. For example, at step 213, based on identifying the one or more stimulus options available for the first user of the first recipient computing device associated with the first event (e.g., recipient computing device 170), event orchestration computing platform 110 may send, via the communication interface (e.g., communication interface 115), to the first recipient computing device associated with the first event (e.g., recipient computing device 170), a first delivery selection user interface. In addition, the first delivery selection user interface may include a first user-selectable component that, when invoked, causes the computing platform (e.g., event orchestration computing platform 110) to create a first new endpoint associated with a first stimulus option of the one or more stimulus options identified as being available for the first user of the first recipient computing device associated with the first event (e.g., recipient computing device 170). For instance, the delivery selection user interface generated by user interface computing platform 120 and sent to recipient computing device 170 by event orchestration computing platform 110 may include a user-selectable component (e.g., a button, a hyperlink, a pull-down menu, and/or the like) that, when invoked, causes event orchestration computing platform 110 to create a new endpoint associated with a specific user-selected stimulus option of the one or more stimulus options identified as being available for the user of recipient computing device 170.

Figure 4:

In sending the first delivery selection user interface to the first recipient computing device associated with the first event (e.g., recipient computing device 170), event orchestration computing platform 110 may cause recipient computing device 170 to display and/or otherwise present the user interface generated by user interface computing platform 120 based on the one or more commands sent to user interface computing platform 120 by event orchestration computing platform 110. For example, in sending the first delivery selection user interface to the first recipient computing device associated with the first event (e.g., recipient computing device 170), event orchestration computing platform 110 may cause recipient computing device 170 to display and/or otherwise present a graphical user interface similar to graphical user interface 400, which is illustrated in FIG. 4. As seen in FIG. 4, graphical user interface 400 may include one or more fields, controls, and/or other elements that may allow a user of recipient computing device 170 to select and/or specify a delivery destination for the first event, such as a delivery destination for funds associated with a cross-border and/or cross-currency payment transaction event being orchestrated by event orchestration computing platform 110. For example, graphical user interface 400 may include one or more fields, controls, and/or other elements that may allow a user of recipient computing device 170 to specify and/or otherwise define a destination parameter associated with the event, a destination type parameter associated with the event (which may, e.g., indicate a destination country and/or a destination currency for a cross-border and/or cross-currency payment transaction event), and/or other parameters associated with the new event. In addition, graphical user interface 400 may include a user-selectable option (e.g., "Stimulus-Destination-1|Other Options") that, when invoked by the user of recipient computing device 170, causes event orchestration computing platform 110 to create a new endpoint associated with a specific user-selected stimulus option of the one or more stimulus options identified as being available for the user of recipient computing device 170. For example, graphical user interface 400 may be configured to present the one or more stimulus options identified as being available for the user of recipient computing device 170 (e.g., in response to receiving input selecting "Other Options") and/or may be configured to cause event orchestration computing platform 110 to create a new endpoint associated with a particular option selected by the user of recipient computing device 170 via graphical user interface 400 (e.g., "Stimulus-Destination-1").

At step 214, event orchestration computing platform 110 may receive delivery selection information from recipient computing device 170. For example, at step 214, event orchestration computing platform 110 may receive, via the communication interface (e.g., communication interface 115), from the first recipient computing device associated with the first event (e.g., recipient computing device 170), first delivery selection information. In addition, the first delivery selection information (which may, e.g., be received by event orchestration computing platform 110 from recipient computing device 170) may include information indicating that the first user-selectable component has been invoked. Further, the first delivery selection information (which may, e.g., be received by event orchestration computing platform 110 from recipient computing device 170) may include information identifying the first new endpoint associated with the first stimulus option as a first destination for the first event selected by the first user of the first recipient computing device associated with the first event (e.g., recipient computing device 170). For instance, event orchestration computing platform 110 may receive from recipient computing device 170 delivery selection information that includes information indicating that the user-selectable component has been invoked (which may, e.g., cause event orchestration computing platform 110 to create a new endpoint associated with a specific user-selected stimulus option) and that further includes information identifying the new endpoint (which may, e.g., be subsequently created by event orchestration computing platform 110, as illustrated below) as the destination that has been selected by the user of recipient computing device 170 to be the destination for the particular event.

At step 215, event orchestration computing platform 110 may validate the delivery selection information received from recipient computing device 170. For example, at step 215, event orchestration computing platform 110 may validate the delivery selection information received from the recipient computing device (e.g., recipient computing device 170). In validating the delivery selection information received from the recipient computing device (e.g., recipient computing device 170), event orchestration computing platform 110 may, for example, execute and/or apply one or more risk analysis evaluation algorithms, regulatory compliance evaluation algorithms, account verification evaluation algorithms, identity verification evaluation algorithms, and/or other algorithms to determine whether the delivery selection information received from the recipient computing device (e.g., recipient computing device 170) is valid. If event orchestration computing platform 110 determines that the delivery selection information received from the recipient computing device (e.g., recipient computing device 170) is invalid, event orchestration computing platform 110 may generate and/or send one or more error messages (e.g., to event recording computing platform 130, client computing device 160, recipient computing device 170, and/or one or more other systems and/or devices). Alternatively, if event orchestration computing platform 110 determines that the delivery selection information received from the recipient computing device (e.g., recipient computing device 170) is valid, the event sequence may continue to step 216 as illustrated in FIG. 2D.

At step 216, event orchestration computing platform 110 may create a new endpoint based on the delivery selection information received from recipient computing device 170. For example, at step 216, event orchestration computing platform 110 may create a first new endpoint associated with a first stimulus option of the one or more stimulus options identified as being available for the first user of the first recipient computing device associated with the first event (e.g., recipient computing device 170) in response to receiving the information indicating that the first user-selectable component has been invoked. For instance, event orchestration computing platform 110 may create a new endpoint corresponding to the stimulus option that has been selected by the user of recipient computing device 170, and the new endpoint may be a new account maintained by a financial institution operating event orchestration computing platform 110 or a different financial institution, a prepaid debit card usable via one or more debit networks, a gift card that is redeemable with and/or otherwise usable with a merchant client or other treasury client which defined the first event, and/or the like.

In some embodiments, creating the first new endpoint associated with the first stimulus option of the one or more stimulus options may include: generating one or more commands directing an event recording computing platform to create at least one record corresponding to the first new endpoint for the first user of the first recipient computing device associated with the first event; and sending, via the communication interface, to the event recording computing platform, the one or more commands directing the event recording computing platform to create the at least one record corresponding to the first new endpoint for the first user of the first recipient computing device associated with the first event. For example, in creating the first new endpoint associated with the first stimulus option of the one or more stimulus options for the first user of the first recipient computing device associated with the first event (e.g., recipient computing device 170), event orchestration computing platform 110 may generate one or more commands directing an event recording computing platform (e.g., event recording computing platform 130) to create at least one record corresponding to the first new endpoint for the first user of the first recipient computing device associated with the first event (e.g., recipient computing device 170). In addition, event orchestration computing platform 110 may send, via the communication interface (e.g., communication interface 115), to the event recording computing platform (e.g., event recording computing platform 130), the one or more commands directing the event recording computing platform (e.g., event recording computing platform 130) to create the at least one record corresponding to the first new endpoint for the first user of the first recipient computing device associated with the first event (e.g., recipient computing device 170). For example, the new endpoint may be a new account maintained by a financial institution operating event orchestration computing platform 110, such as a new foreign, cross-currency banking account or digital wallet account, and the at least one record may include a unique identifier, initial balance, and/or other information associated with the new account being created by event orchestration computing platform 110 in response to the invocation of the dynamic stimulus option. In other examples, the new endpoint may be a new account maintained by a different financial institution than the financial institution operating event orchestration computing platform 110, a prepaid debit card usable via one or more debit networks, a gift card that is redeemable with and/or otherwise usable with a merchant client or other treasury client which defined the first event, and/or the like. In these other instances, event recording computing platform 130 also may create and/or maintain one or more records associated with the new endpoint (e.g., based on commands generated and/or sent to event recording computing platform 130 by event orchestration computing platform 110).

Figure 2E:
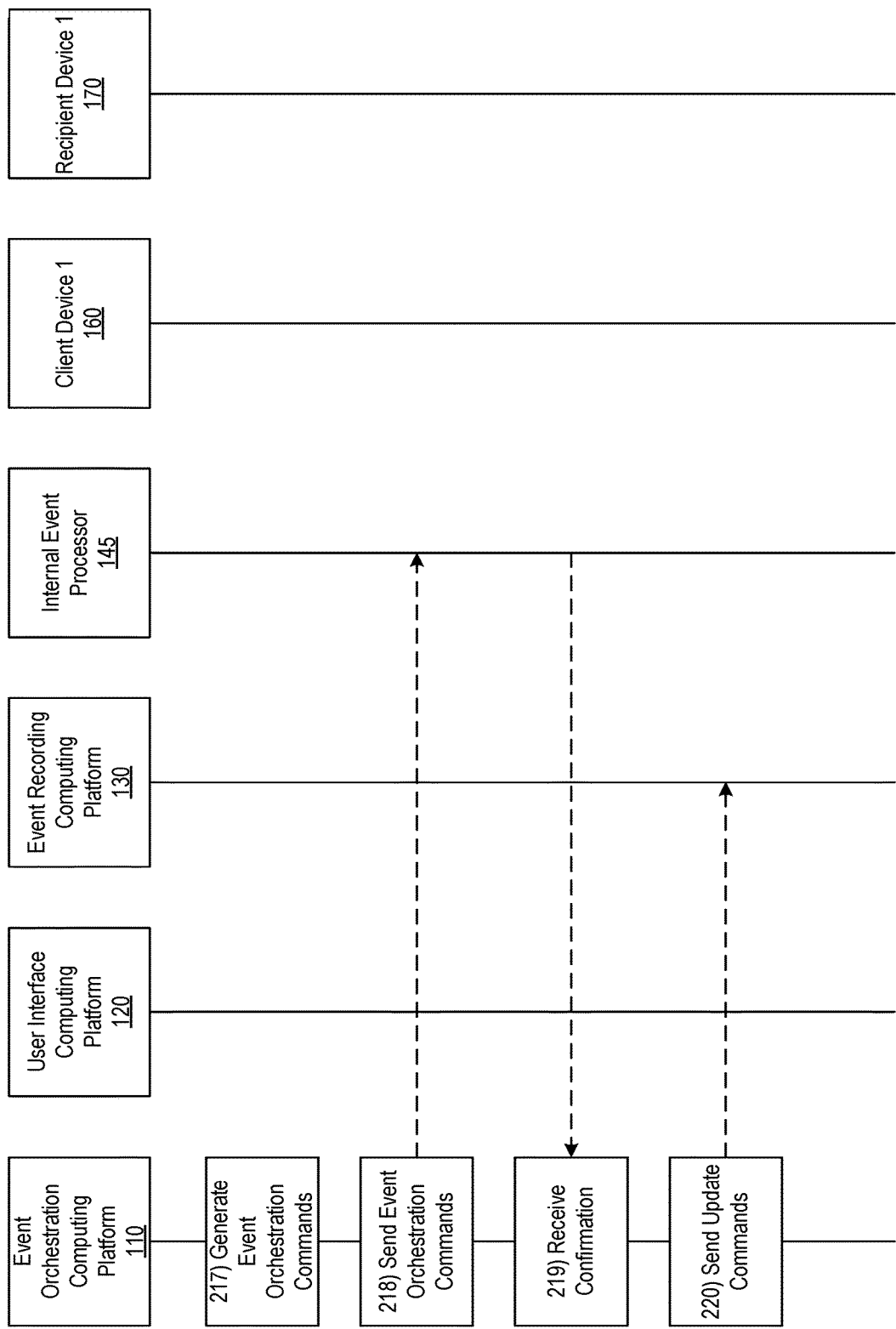

Referring to FIG. 2E, at step 217, event orchestration computing platform 110 may generate one or more event orchestration commands. For example, at step 217, based on receiving the first delivery selection information from the first recipient computing device associated with the first event (e.g., recipient computing device 170), event orchestration computing platform 110 may generate, based on the first delivery selection information, one or more first event orchestration commands directing an event processor (e.g., internal event processor 145) to execute one or more actions associated with the first event. For instance, event orchestration computing platform 110 may generate one or more commands directing and/or controlling internal event processor 145 to execute one or more actions associated with the first event, such as one or more actions that perform and/or complete a payment transaction corresponding to the first event. For example, the one or more commands generated by event orchestration computing platform 110 may direct internal event processor 145 (which may, e.g., be associated with a particular digital wallet service, banking service, or the like) to transfer funds to the new endpoint (which may, e.g., be a new account, a new prepaid debit card, a new gift card, and/or the like, corresponding to the selected stimulus option) created by event orchestration computing platform 110 and selected by the user of the first recipient computing device associated with the first event (e.g., recipient computing device 170).

At step 218, event orchestration computing platform 110 may send the one or more event orchestration commands to internal event processor 145. For example, at step 218, event orchestration computing platform 110 may send, via the communication interface (e.g., communication interface 115), to the event processor (e.g., internal event processor 145), the one or more first event orchestration commands directing the event processor (e.g., internal event processor 145) to execute the one or more actions associated with the first event. In some instances, the event processor (to which event orchestration computing platform 110 may, e.g., send the one or more event orchestration commands) may be an internal event processor (e.g., internal event processor 145) operated by an entity operating the computing platform (e.g., event orchestration computing platform 110). In other instances, the event processor (to which event orchestration computing platform 110 may, e.g., send the one or more event orchestration commands) may be an external event processor (e.g., external event processor 150, external event processor 155) operated by a third-party entity not associated with an entity operating the computing platform (e.g., event orchestration computing platform 110). For example, event orchestration computing platform 110 may send the one or more event orchestration commands to such an external event processor (e.g., external event processor 150, external event processor 155) in instances in which the destination of the event (e.g., the new endpoint) is a new account with a financial institution different from the financial institution operating event orchestration computing platform 110, a prepaid debit card associated with a debit network provided by a financial institution different from the financial institution operating event orchestration computing platform 110, a merchant gift card that is managed and/or processed by a financial institution different from the financial institution operating event orchestration computing platform 110, and/or the like.

At step 219, event orchestration computing platform 110 may receive confirmation information from internal event processor 145. For example, at step 219, event orchestration computing platform 110 may receive from internal event processor 145 confirmation information indicating that one or more actions associated with the first event were performed and/or completed by one or more event servers (e.g., internal event processor 145 and/or related servers and/or systems). At step 220, event orchestration computing platform 110 may send one or more update commands to event recording computing platform 130. For example, at step 220, event orchestration computing platform 110 may send one or more update commands to event recording computing platform 130 directing event recording computing platform 130 to update one or more records indicating that the first event has been completed and/or that one or more actions associated with the first event have been performed based on the one or more event orchestration commands sent to internal event processor 145 by event orchestration computing platform 110 and/or based on the confirmation information received by event orchestration computing platform 110 from internal event processor 145.

By processing client device request data using multicomputer processing and a centralized event orchestrator (e.g., by implementing the techniques and/or performing the steps described above), event orchestration computing platform 110 may provide improved information security and enhanced technical performance (e.g., when processing one or more events defined by a client computing device, such as client computing device 160, and involving a particular recipient computing device, such as recipient computing device 170). Subsequently, event orchestration computing platform 110 may execute one or more actions, similar to those discussed above, in processing one or more additional events, such as a second event involving client computing device 165 and recipient computing device 175, as illustrated in the example event sequence.

Figure 2F:
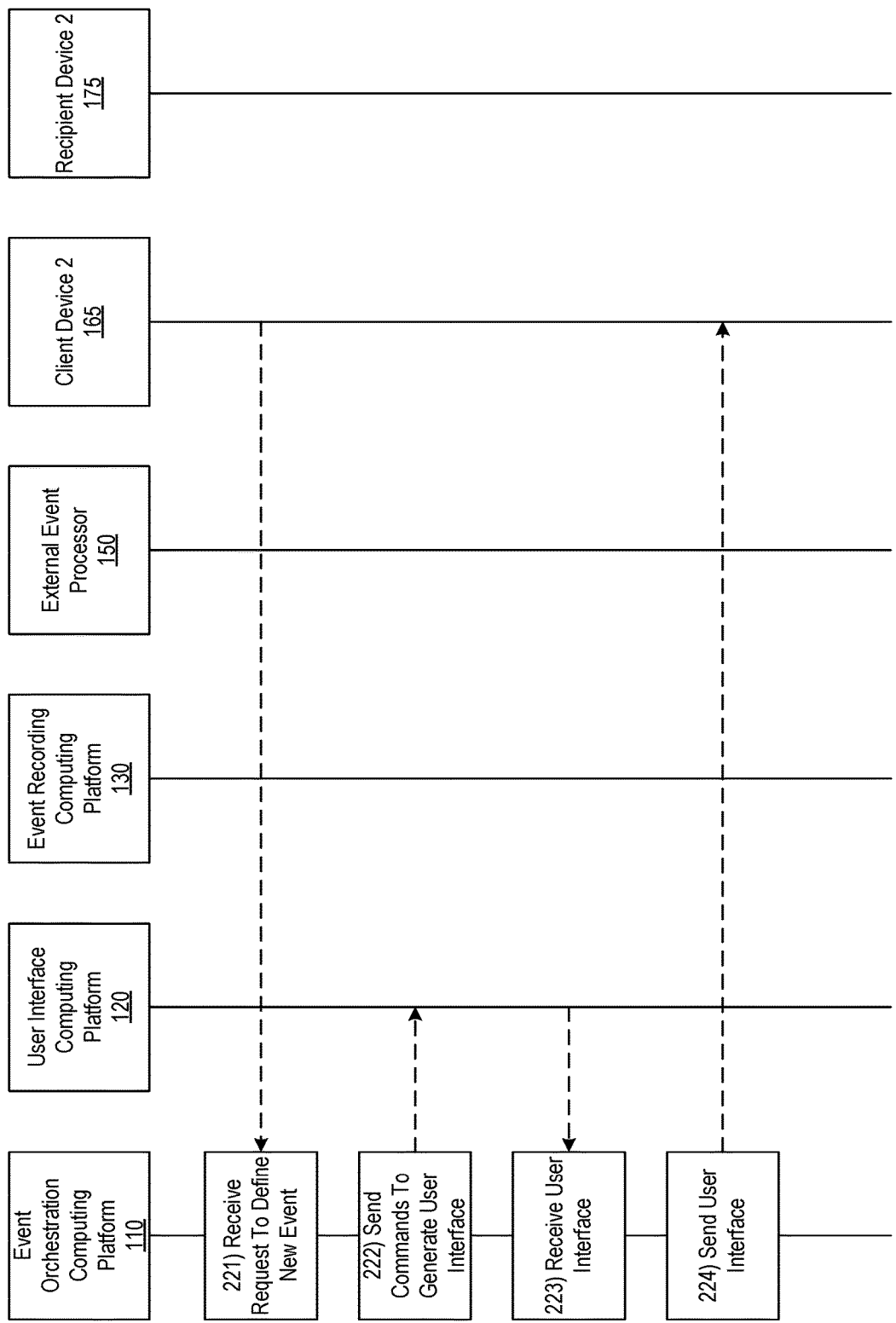

Referring to FIG. 2F, at step 221, event orchestration computing platform 110 may receive a request to define a new event from client computing device 165. For example, at step 221, event orchestration computing platform 110 may receive a message from client computing device 165 requesting an event definition user interface and/or other user interface via which a new event and/or one or more associated event parameters may be defined.

In some instances, the request to define a new event received from client computing device 165 at step 221 may be and/or include a request to define a new payment transaction event, such as a cross-border and/or cross-currency payment transaction event, to be orchestrated by event orchestration computing platform 110. For instance, event orchestration computing platform 110 may be operated by and/or associated with a financial institution, and client computing device 165 may be operated by and/or associated with an individual client of the financial institution or a treasury client of the financial institution. The client of the financial institution associated with client computing device 165 may, for instance, request to define a new payment transaction event, such as a cross-border and/or cross-currency payment transaction event, that is to be orchestrated by event orchestration computing platform 110 and that may involve a payment by the client of the financial institution to a specific recipient (which may, e.g., be associated with a specific recipient device, such as recipient computing device 175). As illustrated in greater detail below, the client of the financial institution may identify the specific recipient of the new payment transaction event only by an alias, such as an email address, a mobile telephone number, a social networking handle, and/or the like (e.g., rather than identifying the specific recipient of the new payment transaction event by a legal name and/or account number), and event orchestration computing platform 110 may use this alias information to contact the specific recipient of the new payment transaction event and provide them with recipient-selection functionality that allows the specific recipient of the new payment transaction event to select how they would like to receive the funds corresponding to the new payment transaction event (e.g., in a particular digital wallet, bank account, and/or the like). In addition, the new payment transaction event may, in some instances, be a cross-border payment transaction event in which the client of the financial institution and the specific recipient of the new payment transaction may be located in and/or otherwise be associated with different countries. Additionally or alternatively, the new payment transaction event may, in some instances, be a cross-currency payment transaction event in which the client of the financial institution may provide funds to the financial institution for payment in a second currency, and in which the specific recipient of the new payment transaction may receive the funds in a second currency different from the second currency.

At step 222, event orchestration computing platform 110 may send one or more commands to user interface computing platform 120 directing user interface computing platform 120 to generate a user interface. For example, at step 202, event orchestration computing platform 110 may generate and/or send one or more commands to user interface computing platform 120 directing user interface computing platform 120 to generate a user interface that is configured to allow a user of client computing device 165 to define a new event, such as a new cross-border and/or cross-currency payment transaction event, to be orchestrated by event orchestration computing platform 110. The one or more commands generated by event orchestration computing platform 110 and/or sent by event orchestration computing platform 110 to user interface computing platform 120 may include parameters and/or other information identifying a client of an organization operating event orchestration computing platform 110 with which the request to define the new event is associated (e.g., the client of the organization linked to and/or otherwise associated with client computing device 165), parameters and/or other information identifying the user interface that is requested, and/or other parameters and information. At step 223, event orchestration computing platform 110 may receive a user interface generated by user interface computing platform 120 from user interface computing platform 120. For example, at step 223, event orchestration computing platform 110 may receive from user interface computing platform 120 a user interface generated by user interface computing platform 120 based on the one or more commands sent to user interface computing platform 120 by event orchestration computing platform 110.

Figure 5:
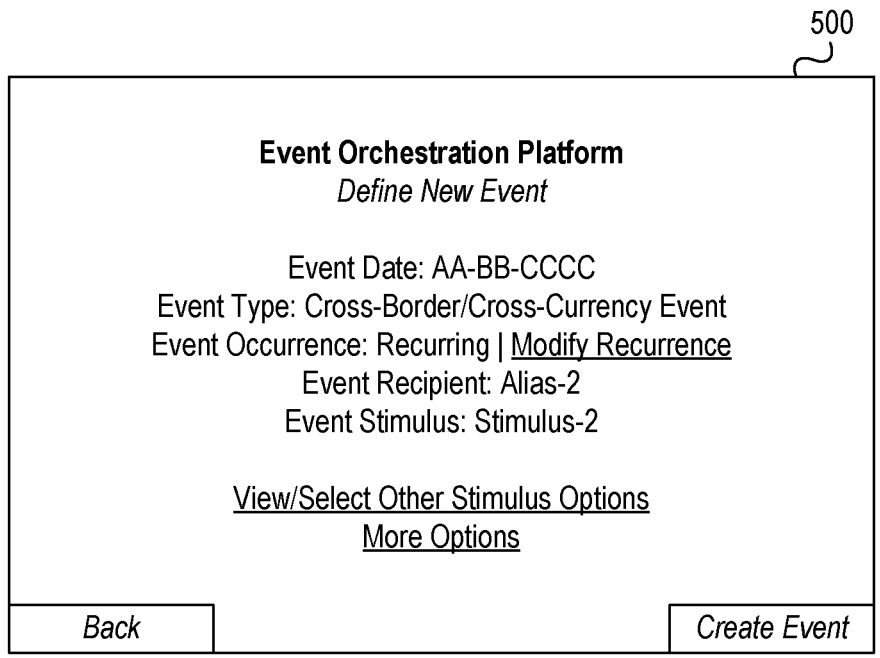

At step 224, event orchestration computing platform 110 may send the user interface to client computing device 165. In sending the user interface to client computing device 165, event orchestration computing platform 110 may cause client computing device 165 to display and/or otherwise present the user interface generated by user interface computing platform 120 based on the one or more commands sent to user interface computing platform 120 by event orchestration computing platform 110. For example, in sending the user interface to client computing device 165, event orchestration computing platform 110 may cause client computing device 165 to display and/or otherwise present a graphical user interface similar to graphical user interface 500, which is illustrated in FIG. 5. As seen in FIG. 5, graphical user interface 500 may include one or more fields, controls, and/or other elements that may allow a user of client computing device 165 to define a new event, such as a new cross-border and/or cross-currency payment transaction event, to be orchestrated by event orchestration computing platform 110. For example, graphical user interface 500 may include one or more fields, controls, and/or other elements that may allow a user of client computing device 165 to specify and/or otherwise define an event date parameter associated with the new event, an event type parameter associated with the new event, an event occurrence parameter associated with the new event, an event recipient parameter associated with the new event, an event stimulus parameter associated with the new event, and/or other parameters associated with the new event.

In addition, and as seen in FIG. 5, graphical user interface 500 may include one or more fields, controls, and/or other elements that may allow a user of client computing device 165 to identify a recipient associated with the event using an alias, such as an email address, a mobile telephone number, a social networking handle, and/or the like (e.g., rather than identifying the recipient of the new event by a legal name and/or account number), and event orchestration computing platform 110 subsequently may use this alias information to contact the specific recipient of the new event and provide them with recipient-selection functionality (which may, e.g., allow the specific recipient of a new payment transaction event to select how they would like to receive the funds corresponding to the new payment transaction event, such as in a particular digital wallet, bank account, and/or the like). Graphical user interface 500 also may include one or more fields, controls, and/or other elements that may allow a user of client computing device 165 to view and/or select various stimulus options that may be available in connection with a new event (e.g., "View/Select Other Stimulus Options"). Such other stimulus options that may be available in connection with the new event may, for example, include one or more stimulus options that are designed to incentivize a recipient of the new event to select to receive funds associated with the new event via a particular delivery method, such as in a new account maintained by a financial institution operating event orchestration computing platform 110 or a different financial institution, via a prepaid debit card usable via one or more debit networks, via a gift card that is redeemable with and/or otherwise usable with a merchant client or other treasury client defining the new event, and/or the like.

Referring to FIG. 2G, at step 225, event orchestration computing platform 110 may receive event definition information from client computing device 165, and the event definition information received by event orchestration computing platform 110 from client computing device 165 may, in some instances, include stimulus selection information specified by a user of client computing device 165. For example, at step 225, event orchestration computing platform 110 may receive, via the communication interface (e.g., communication interface 115), from a second client computing device (e.g., client computing device 165), second event definition information defining a second event, and the second event definition information may include second stimulus selection information associated with the second event. The second event definition information defining the second event to be orchestrated by event orchestration computing platform 110 and the second stimulus selection information associated with the second event may, for instance, be received via an event definition user interface generated by user interface computing platform 120 and sent to client computing device 165 by event orchestration computing platform 110 (e.g., the user interface sent by event orchestration computing platform 110 to client computing device 165 at step 224). In addition, the second stimulus selection information associated with the second event may, for example, identify one or more specific stimulus options specified by the user of client computing device 165 to be offered to the recipient of the new event as incentives to receive funds associated with the new event via a particular delivery method corresponding to the one or more specific stimulus options specified by the user of client computing device 165. For example, the second stimulus selection information associated with the second event may, for example, identify and/or specify that the recipient of the new event should be prompted to select whether to receive funds associated with the new event in a new account maintained by a financial institution operating event orchestration computing platform 110 or a different financial institution, via a prepaid debit card usable via one or more debit networks, via a gift card that is redeemable with and/or otherwise usable with a merchant client or other treasury client using client computing device 165 to define the new event, and/or via one or more other delivery methods associated with other stimulus options.

In some embodiments, receiving the second event definition information defining the second event may include receiving information defining one or more parameters of the second event from the second client computing device. For example, in receiving the second event definition information defining the second event, event orchestration computing platform 110 may receive information defining one or more parameters of the second event from the second client computing device (e.g., client computing device 165). For example, the second event definition information defining the second event to be orchestrated by event orchestration computing platform 110 (which may, e.g., be received by event orchestration computing platform 110 from client computing device 165 at step 225) may include one or more parameters and/or other information specified by a user of client computing device 165. For example, the second event to be orchestrated by event orchestration computing platform 110 may be a payment transaction, and the one or more parameters and/or other information specified by the user of client computing device 165 may identify a recipient of the transaction to be paid, an amount to be paid to the recipient of the transaction, whether the transaction has a single occurrence or multiple occurrences, and/or other characteristics of the transaction.

In some embodiments, the information defining the one or more parameters of the second event may include information defining the second event as a single event having a single occurrence. For example, the information defining the one or more parameters of the second event (which may, e.g., be received by event orchestration computing platform 110 from client computing device 165) may include information defining the second event as a single event having a single occurrence. For instance, the second event may correspond to a new payment transaction involving a single payment to an identified recipient. In some embodiments, the information defining the one or more parameters of the second event may include information defining the second event as a recurring event having multiple occurrences. For example, the information defining the one or more parameters of the second event (which may, e.g., be received by event orchestration computing platform 110 from client computing device 165) may include information defining the second event as a recurring event having multiple occurrences. For instance, the second event may correspond to a new payment transaction involving multiple recurring payments to an identified recipient.

At step 226, event orchestration computing platform 110 may generate an event notification. For example, at step 226, event orchestration computing platform 110 may generate an event notification for recipient computing device 175 based on receiving event definition information from client computing device 165 identifying an alias linked to recipient computing device 175 as a recipient associated with the event defined by the event definition information received from client computing device 165. At step 227, event orchestration computing platform 110 may send the event notification to recipient computing device 175. In sending the event notification to recipient computing device 175, event orchestration computing platform 110 may, for instance, send the event notification to recipient computing device 175 via a push notification service associated with an operating system executing on recipient computing device 175. Additionally or alternatively, in sending the event notification to recipient computing device 175, event orchestration computing platform 110 may send an electronic mail message, a short message service message, and/or another type of electronic message to recipient computing device 175.

At step 228, event orchestration computing platform 110 may receive a request for a delivery selection user interface (which may, e.g., also be referred to as a recipient-selection user interface) from recipient computing device 175. For example, at step 228, event orchestration computing platform 110 may receive, via the communication interface (e.g., communication interface 115), from a second recipient computing device associated with the second event (e.g., recipient computing device 175), a second request for a recipient-selection user interface. For instance, event orchestration computing platform 110 may receive such a request after recipient computing device 175 sends the request in response to receiving a selection or other user input in response to presenting the event notification received from event orchestration computing platform 110.

In some embodiments, the second recipient computing device associated with the second event may be linked to a second alias identified as a recipient in the second event definition information. For example, the second recipient computing device associated with the second event (e.g., recipient computing device 175) may be linked to a second alias identified as a recipient in the second event definition information (which may, e.g., be received by event orchestration computing platform 110 from client computing device 165). In some instances, the second alias identified as the recipient in the second event definition information (which may, e.g., be received by event orchestration computing platform 110 from client computing device 165) may include an email address. For example, the second alias identified as the recipient in the second event definition information received by event orchestration computing platform 110 from client computing device 165 may include an email address that is linked to, registered with, and/or otherwise associated with the second recipient computing device associated with the second event (e.g., recipient computing device 175) as an alias of the second recipient computing device associated with the second event (e.g., recipient computing device 175). Additionally or alternatively, the second alias identified as the recipient in the second event definition information (which may, e.g., be received by event orchestration computing platform 110 from client computing device 165) may include a mobile telephone number. For example, the second alias identified as the recipient in the second event definition information received by event orchestration computing platform 110 from client computing device 165 may include a mobile telephone number that is linked to, registered with, and/or otherwise associated with the second recipient computing device associated with the second event (e.g., recipient computing device 175) as an alias of the second recipient computing device associated with the second event (e.g., recipient computing device 175).

Figure 2H:
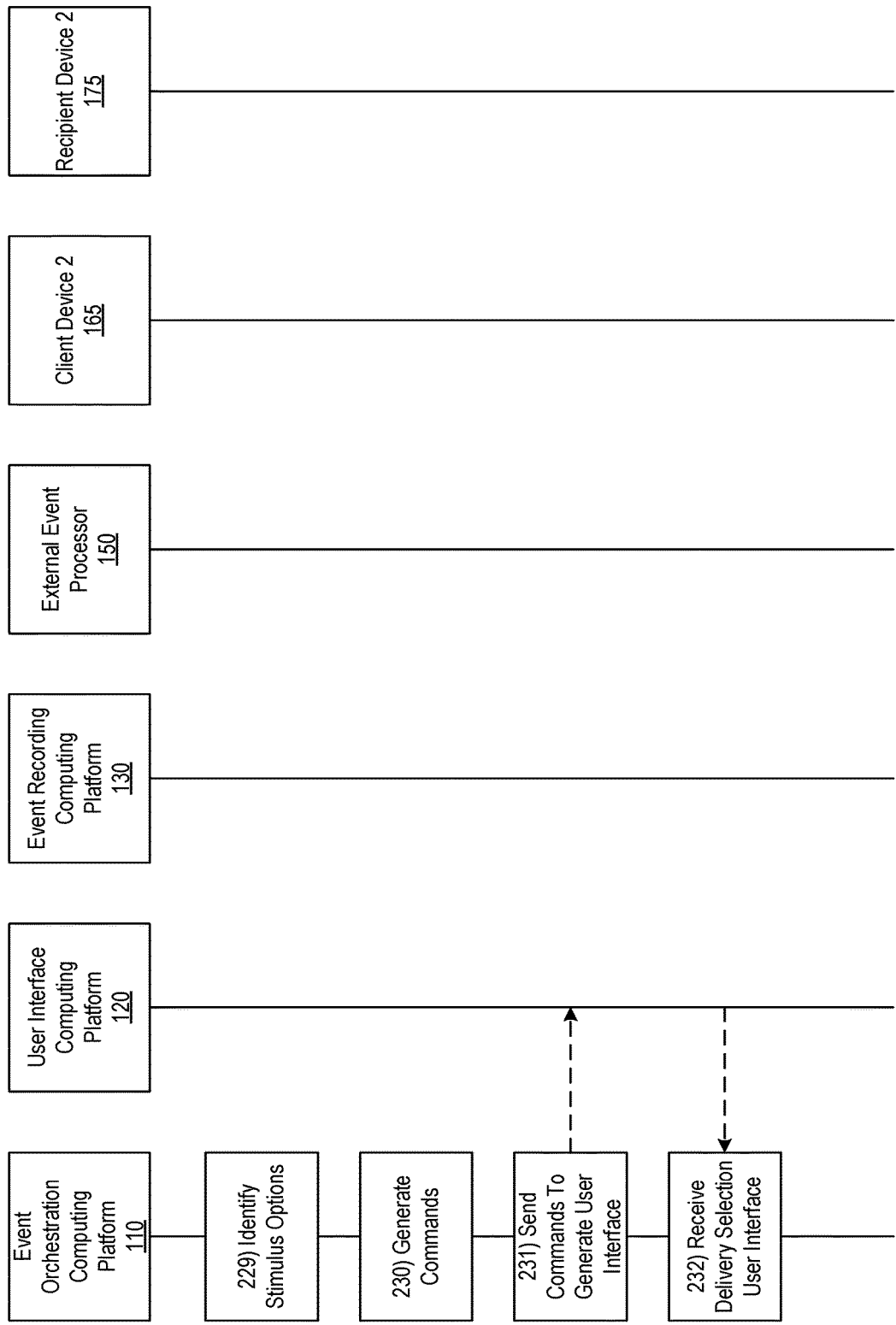

Referring to FIG. 2H, at step 229, event orchestration computing platform 110 may identify one or more stimulus options available for a user of recipient computing device 175. For example, at step 229, based on receiving the second request for the recipient-selection user interface from the second recipient computing device associated with the second event (e.g., recipient computing device 175), event orchestration computing platform 110 may identify one or more stimulus options available for a second user of the second recipient computing device associated with the second event (e.g., recipient computing device 175) based on the second stimulus selection information associated with the second event. In identifying the one or more stimulus options available for the second user of the second recipient computing device associated with the second event (e.g., recipient computing device 175), event orchestration computing platform 110 may, for example, select one or more stimulus options to be offered to the second user of the second recipient computing device associated with the second event (e.g., recipient computing device 175) based on the stimulus selection information associated with the second event received from client computing device 165, based on user profile information corresponding to the recipient and/or another user of recipient computing device 175, and/or other factors. For example, certain stimulus options may be available to a particular user or a particular group of users, and other, different stimulus options may be available to a different user or a different group of users.

In some embodiments, identifying the one or more stimulus options available for the second user of the second recipient computing device associated with the second event may include identifying at least one stimulus option as available for the second user of the second recipient computing device associated with the second event based on the at least one stimulus option being specified by a user of the second client computing device in the second stimulus selection information associated with the second event. For example, in identifying the one or more stimulus options available for the second user of the second recipient computing device associated with the second event (e.g., recipient computing device 175), event orchestration computing platform 110 may identify at least one stimulus option as available for the second user of the second recipient computing device associated with the second event (e.g., recipient computing device 175) based on the at least one stimulus option being specified by a user of the second client computing device (e.g., client computing device 165) in the second stimulus selection information associated with the second event. For instance, event orchestration computing platform 110 may identify and/or otherwise select one or more particular stimulus options to be offered that were specified by the user of client computing device 165 in the event definition information for the particular event received by event orchestration computing platform 110 from client computing device 165.

At step 230, event orchestration computing platform 110 may generate one or more commands directing user interface computing platform 120 to generate a delivery selection user interface. For example, at step 230, event orchestration computing platform 110 may generate one or more commands directing user interface computing platform 120 to generate a delivery selection user interface for recipient computing device 175 that includes a dynamic stimulus option (e.g., based on identifying the one or more stimulus options available for the user of recipient computing device 175). For instance, the one or more commands generated by event orchestration computing platform 110 may direct user interface computing platform 120 to insert and/or include one or more controls and/or other user interface elements in the delivery selection user interface that are configured to offer and/or otherwise provide the one or more stimulus options that were identified and/or otherwise selected by event orchestration computing platform 110 for the user of recipient computing device 175. At step 231, event orchestration computing platform 110 may send the one or more commands to user interface computing platform 120 directing user interface computing platform 120 to generate a delivery selection user interface. For example, at step 231, event orchestration computing platform 110 may send, via the communication interface (e.g., communication interface 115), to a user interface computing platform (e.g., user interface computing platform 120), one or more commands directing the user interface computing platform (e.g., user interface computing platform 120) to generate the delivery selection user interface. The one or more commands generated by event orchestration computing platform 110 and/or sent by event orchestration computing platform 110 to user interface computing platform 120 may include parameters and/or other information identifying the second recipient computing device associated with the second event (e.g., recipient computing device 175) and/or the entity identified as the recipient for the second event (e.g., a registered and/or authorized user of recipient computing device 175), parameters and/or other information identifying the user interface that is requested (e.g., one or more parameters directing and/or causing user interface computing platform 120 to include the identified stimulus options in the delivery selection user interface), and/or other parameters and information.

At step 232, event orchestration computing platform 110 may receive a delivery selection user interface generated by user interface computing platform 120 from user interface computing platform 120. For example, at step 232, event orchestration computing platform 110 may receive, via the communication interface (e.g., communication interface 115), from the user interface computing platform (e.g., user interface computing platform 120), the delivery selection user interface. For instance, at step 232, event orchestration computing platform 110 may receive from user interface computing platform 120 a user interface generated by user interface computing platform 120 based on the one or more commands sent to user interface computing platform 120 by event orchestration computing platform 110.

Referring to FIG. 2I, at step 233, event orchestration computing platform 110 may send the delivery selection user interface generated by user interface computing platform 120 to recipient computing device 175. For example, at step 233, based on identifying the one or more stimulus options available for the second user of the second recipient computing device associated with the second event (e.g., recipient computing device 175), event orchestration computing platform 110 may send, via the communication interface (e.g., communication interface 115), to the second recipient computing device associated with the second event (e.g., recipient computing device 175), a second delivery selection user interface. In addition, the second delivery selection user interface may include a second user-selectable component that, when invoked, causes the computing platform (e.g., event orchestration computing platform 110) to create a second new endpoint associated with a second stimulus option of the one or more stimulus options identified as being available for the second user of the second recipient computing device associated with the second event (e.g., recipient computing device 175). For instance, the delivery selection user interface generated by user interface computing platform 120 and sent to recipient computing device 175 by event orchestration computing platform 110 may include a user-selectable component (e.g., a button, a hyperlink, a pull-down menu, and/or the like) that, when invoked, causes event orchestration computing platform 110 to create a new endpoint associated with a specific user-selected stimulus option of the one or more stimulus options identified as being available for the user of recipient computing device 175.

Figure 6:

In sending the second delivery selection user interface to the second recipient computing device associated with the second event (e.g., recipient computing device 175), event orchestration computing platform 110 may cause recipient computing device 175 to display and/or otherwise present the user interface generated by user interface computing platform 120 based on the one or more commands sent to user interface computing platform 120 by event orchestration computing platform 110. For example, in sending the second delivery selection user interface to the second recipient computing device associated with the second event (e.g., recipient computing device 175), event orchestration computing platform 110 may cause recipient computing device 175 to display and/or otherwise present a graphical user interface similar to graphical user interface 600, which is illustrated in FIG. 6. As seen in FIG. 6, graphical user interface 600 may include one or more fields, controls, and/or other elements that may allow a user of recipient computing device 175 to select and/or specify a delivery destination for the second event, such as a delivery destination for funds associated with a cross-border and/or cross-currency payment transaction event being orchestrated by event orchestration computing platform 110. For example, graphical user interface 600 may include one or more fields, controls, and/or other elements that may allow a user of recipient computing device 175 to specify and/or otherwise define a destination parameter associated with the event, a destination type parameter associated with the event (which may, e.g., indicate a destination country and/or a destination currency for a cross-border and/or cross-currency payment transaction event), and/or other parameters associated with the new event. In addition, graphical user interface 600 may include a user-selectable option (e.g., "Stimulus-Destination-2 | Other Options") that, when invoked by the user of recipient computing device 175, causes event orchestration computing platform 110 to create a new endpoint associated with a specific user-selected stimulus option of the one or more stimulus options identified as being available for the user of recipient computing device 175. For example, graphical user interface 600 may be configured to present the one or more stimulus options identified as being available for the user of recipient computing device 175 (e.g., in response to receiving input selecting "Other Options") and/or may be configured to cause event orchestration computing platform 110 to create a new endpoint associated with a particular option selected by the user of recipient computing device 175 via graphical user interface 600 (e.g., "Stimulus-Destination-2").

At step 234, event orchestration computing platform 110 may receive delivery selection information from recipient computing device 175. For example, at step 234, event orchestration computing platform 110 may receive, via the communication interface (e.g., communication interface 115), from the second recipient computing device associated with the second event (e.g., recipient computing device 175), second delivery selection information. In addition, the second delivery selection information (which may, e.g., be received by event orchestration computing platform 110 from recipient computing device 175) may include information indicating that the second user-selectable component has been invoked. Further, the second delivery selection information (which may, e.g., be received by event orchestration computing platform 110 from recipient computing device 175) may include information identifying the second new endpoint associated with the second stimulus option as a second destination for the second event selected by the second user of the second recipient computing device associated with the second event (e.g., recipient computing device 175). For instance, event orchestration computing platform 110 may receive from recipient computing device 175 delivery selection information that includes information indicating that the user-selectable component has been invoked (which may, e.g., cause event orchestration computing platform 110 to create a new endpoint associated with a specific user-selected stimulus option) and that further includes information identifying the new endpoint (which may, e.g., be subsequently created by event orchestration computing platform 110, as illustrated below) as the destination that has been selected by the user of recipient computing device 175 to be the destination for the particular event.

At step 235, event orchestration computing platform 110 may validate the delivery selection information received from recipient computing device 175. For example, at step 235, event orchestration computing platform 110 may validate the delivery selection information received from the recipient computing device (e.g., recipient computing device 175). In validating the delivery selection information received from the recipient computing device (e.g., recipient computing device 175), event orchestration computing platform 110 may, for example, execute and/or apply one or more risk analysis evaluation algorithms, regulatory compliance evaluation algorithms, account verification evaluation algorithms, identity verification evaluation algorithms, and/or other algorithms to determine whether the delivery selection information received from the recipient computing device (e.g., recipient computing device 175) is valid. If event orchestration computing platform 110 determines that the delivery selection information received from the recipient computing device (e.g., recipient computing device 175) is invalid, event orchestration computing platform 110 may generate and/or send one or more error messages (e.g., to event recording computing platform 130, client computing device 165, recipient computing device 175, and/or one or more other systems and/or devices). Alternatively, if event orchestration computing platform 110 determines that the delivery selection information received from the recipient computing device (e.g., recipient computing device 175) is valid, the event sequence may continue to step 236 as illustrated in FIG. 2I.

At step 236, event orchestration computing platform 110 may create a new endpoint based on the delivery selection information received from recipient computing device 175. For example, at step 236, event orchestration computing platform 110 may create a second new endpoint associated with a second stimulus option of the one or more stimulus options identified as being available for the second user of the second recipient computing device associated with the second event (e.g., recipient computing device 175) in response to receiving the information indicating that the second user-selectable component has been invoked. For instance, event orchestration computing platform 110 may create a new endpoint corresponding to the stimulus option that has been selected by the user of recipient computing device 175, and the new endpoint may be a new account maintained by a financial institution operating event orchestration computing platform 110 or a different financial institution, a prepaid debit card usable via one or more debit networks, a gift card that is redeemable with and/or otherwise usable with a merchant client or other treasury client which defined the second event, and/or the like.

In some embodiments, creating the second new endpoint associated with the second stimulus option of the one or more stimulus options may include: generating one or more commands directing an event recording computing platform to create at least one record corresponding to the second new endpoint for the second user of the second recipient computing device associated with the second event; and sending, via the communication interface, to the event recording computing platform, the one or more commands directing the event recording computing platform to create the at least one record corresponding to the second new endpoint for the second user of the second recipient computing device associated with the second event. For example, in creating the second new endpoint associated with the second stimulus option of the one or more stimulus options for the second user of the second recipient computing device associated with the second event (e.g., recipient computing device 175), event orchestration computing platform 110 may generate one or more commands directing an event recording computing platform (e.g., event recording computing platform 130) to create at least one record corresponding to the second new endpoint for the second user of the second recipient computing device associated with the second event (e.g., recipient computing device 175). In addition, event orchestration computing platform 110 may send, via the communication interface (e.g., communication interface 115), to the event recording computing platform (e.g., event recording computing platform 130), the one or more commands directing the event recording computing platform (e.g., event recording computing platform 130) to create the at least one record corresponding to the second new endpoint for the second user of the second recipient computing device associated with the second event (e.g., recipient computing device 175). For example, the new endpoint may be a new account maintained by a financial institution operating event orchestration computing platform 110, such as a new foreign, cross-currency banking account or digital wallet account, and the at least one record may include a unique identifier, initial balance, and/or other information associated with the new account being created by event orchestration computing platform 110 in response to the invocation of the dynamic stimulus option. In other examples, the new endpoint may be a new account maintained by a different financial institution than the financial institution operating event orchestration computing platform 110, a prepaid debit card usable via one or more debit networks, a gift card that is redeemable with and/or otherwise usable with a merchant client or other treasury client which defined the second event, and/or the like. In these other instances, event recording computing platform 130 also may create and/or maintain one or more records associated with the new endpoint (e.g., based on commands generated and/or sent to event recording computing platform 130 by event orchestration computing platform 110).

Referring to FIG. 2J, at step 237, event orchestration computing platform 110 may generate one or more event orchestration commands. For example, at step 237, based on receiving the second delivery selection information from the second recipient computing device associated with the second event (e.g., recipient computing device 175), event orchestration computing platform 110 may generate, based on the second delivery selection information, one or more second event orchestration commands directing an event processor (e.g., external event processor 150) to execute one or more actions associated with the second event. For instance, event orchestration computing platform 110 may generate one or more commands directing and/or controlling external event processor 150 to execute one or more actions associated with the second event, such as one or more actions that perform and/or complete a payment transaction corresponding to the second event. For example, the one or more commands generated by event orchestration computing platform 110 may direct external event processor 150 (which may, e.g., be associated with a particular digital wallet service, banking service, or the like) to transfer funds to the new endpoint (which may, e.g., be a new account, a new prepaid debit card, a new gift card, and/or the like, corresponding to the selected stimulus option) created by event orchestration computing platform 110 and selected by the user of the second recipient computing device associated with the second event (e.g., recipient computing device 175).

At step 238, event orchestration computing platform 110 may send the one or more event orchestration commands to external event processor 150. For example, at step 238, event orchestration computing platform 110 may send, via the communication interface (e.g., communication interface 115), to the event processor (e.g., external event processor 150), the one or more second event orchestration commands directing the event processor (e.g., external event processor 150) to execute the one or more actions associated with the second event. In some instances, the event processor (to which event orchestration computing platform 110 may, e.g., send the one or more event orchestration commands) may be an internal event processor (e.g., internal event processor 145) operated by an entity operating the computing platform (e.g., event orchestration computing platform 110). In other instances, the event processor (to which event orchestration computing platform 110 may, e.g., send the one or more event orchestration commands) may be an external event processor (e.g., external event processor 150, external event processor 155) operated by a third-party entity not associated with an entity operating the computing platform (e.g., event orchestration computing platform 110). For example, event orchestration computing platform 110 may send the one or more event orchestration commands to such an external event processor (e.g., external event processor 150, external event processor 155) in instances in which the destination of the event (e.g., the new endpoint) is a new account with a financial institution different from the financial institution operating event orchestration computing platform 110, a prepaid debit card associated with a debit network provided by a financial institution different from the financial institution operating event orchestration computing platform 110, a merchant gift card that is managed and/or processed by a financial institution different from the financial institution operating event orchestration computing platform 110, and/or the like.

At step 239, event orchestration computing platform 110 may receive confirmation information from external event processor 150. For example, at step 239, event orchestration computing platform 110 may receive from external event processor 150 confirmation information indicating that one or more actions associated with the second event were performed and/or completed by one or more event servers (e.g., external event processor 150 and/or related servers and/or systems). At step 240, event orchestration computing platform 110 may send one or more update commands to event recording computing platform 130. For example, at step 240, event orchestration computing platform 110 may send one or more update commands to event recording computing platform 130 directing event recording computing platform 130 to update one or more records indicating that the second event has been completed and/or that one or more actions associated with the second event have been performed based on the one or more event orchestration commands sent to external event processor 150 by event orchestration computing platform 110 and/or based on the confirmation information received by event orchestration computing platform 110 from external event processor 150.

Figure 7:
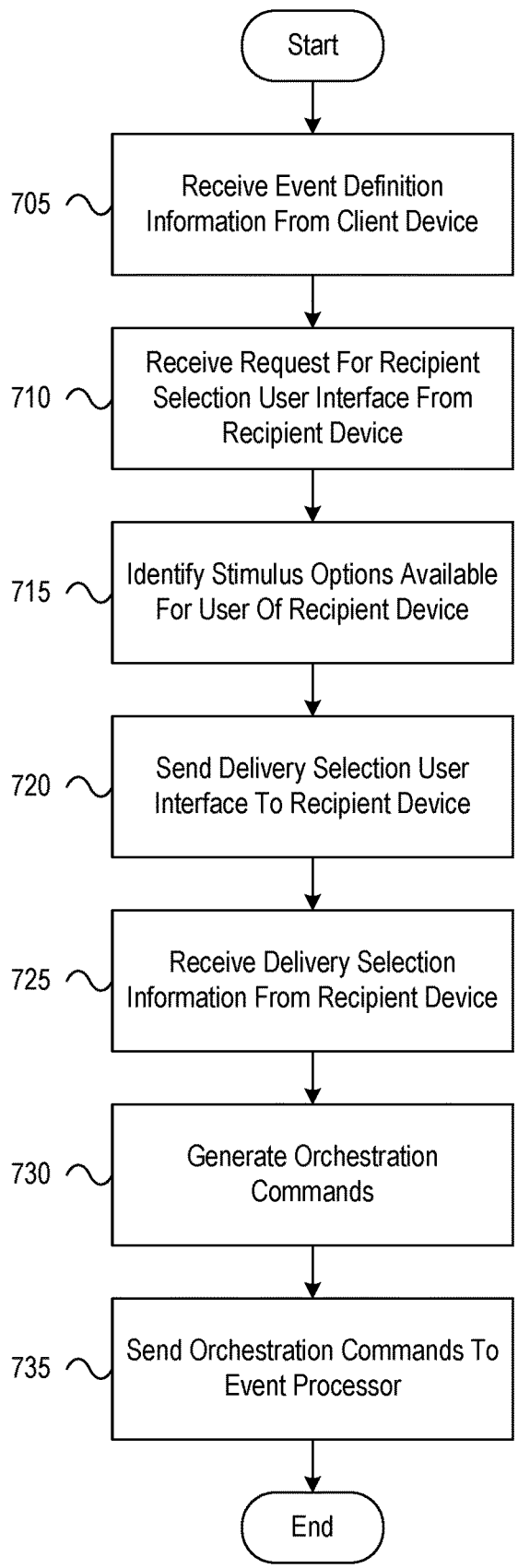
FIG. 7 depicts an illustrative method for multicomputer processing of client device request data using a centralized event orchestrator in accordance with one or more example embodiments.

FIG. 7 depicts an illustrative method for multicomputer processing of client device request data using a centralized event orchestrator in accordance with one or more example embodiments. Referring to FIG. 7, at step 705, a computing platform having at least one processor, a memory, and a communication interface may receive, via the communication interface, from a first client computing device, first event definition information defining a first event, and the first event definition information may include first stimulus selection information associated with the first event. At step 710, the computing platform may receive, via the communication interface, from a first recipient computing device associated with the first event, a first request for a recipient-selection user interface. At step 715, based on receiving the first request for the recipient-selection user interface from the first recipient computing device associated with the first event, the computing platform may identify one or more stimulus options available for a first user of the first recipient computing device associated with the first event based on the first stimulus selection information associated with the first event.

At step 720, based on identifying the one or more stimulus options available for the first user of the first recipient computing device associated with the first event, the computing platform may send, via the communication interface, to the first recipient computing device associated with the first event, a first delivery selection user interface, and the first delivery selection user interface may include a first user-selectable component that, when invoked, causes the computing platform to create a first new endpoint associated with a first stimulus option of the one or more stimulus options identified as being available for the first user of the first recipient computing device associated with the first event. At step 725, the computing platform may receive, via the communication interface, from the first recipient computing device associated with the first event, first delivery selection information, and the first delivery selection information may include information indicating that the first user-selectable component has been invoked, and the first delivery selection information may include information identifying the first new endpoint associated with the first stimulus option as a first destination for the first event selected by the first user of the first recipient computing device associated with the first event. At step 730, based on receiving the first delivery selection information from the first recipient computing device associated with the first event, the computing platform may generate, based on the first delivery selection information, one or more first event orchestration commands directing an event processor to execute one or more actions associated with the first event. At step 735, the computing platform may send, via the communication interface, to the event processor, the one or more first event orchestration commands directing the event processor to execute the one or more actions associated with the first event.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform, comprising:
at least one processor;
a communication interface communicatively coupled to the at least one processor; and
memory storing computer-readable instructions that, when executed by the at least one processor, cause the computing platform to:
receive, via the communication interface, from a first client computing device, first event definition information defining a first event, the first event definition information comprising first stimulus selection information associated with the first event;

receive, via the communication interface, from a first recipient computing device associated with the first event, a first request for a recipient-selection user interface;

based on receiving the first request for the recipient-selection user interface from the first recipient computing device associated with the first event, identify one or more stimulus options available for a first user of the first recipient computing device associated with the first event based on the first stimulus selection information associated with the first event;

based on identifying the one or more stimulus options available for the first user of the first recipient computing device associated with the first event, send, via the communication interface, to the first recipient computing device associated with the first event, a first delivery selection user interface, the first delivery selection user interface comprising a first user-selectable component that, when invoked, causes the computing platform to create a first new endpoint associated with a first stimulus option of the one or more stimulus options identified as being available for the first user of the first recipient computing device associated with the first event;

receive, via the communication interface, from the first recipient computing device associated with the first event, first delivery selection information, the first delivery selection information comprising information indicating that the first user-selectable component has been invoked, and the first delivery selection information comprising information identifying the first new endpoint associated with the first stimulus option as a first destination for the first event selected by the first user of the first recipient computing device associated with the first event;

based on receiving the first delivery selection information from the first recipient computing device associated with the first event, generate, based on the first delivery selection information, one or more first event orchestration commands directing an event processor to execute one or more actions associated with the first event; and send, via the communication interface, to the event processor, the one or more first event orchestration commands directing the event processor to execute the one or more actions associated with the first event.

2. The computing platform of claim 1, wherein receiving the first event definition information defining the first event comprises receiving information defining one or more parameters of the first event from the first client computing device.

3. The computing platform of claim 2, wherein the information defining the one or more parameters of the first event comprises information defining the first event as a single event having a single occurrence.

4. The computing platform of claim 2, wherein the information defining the one or more parameters of the first event comprises information defining the first event as a recurring event having multiple occurrences.

5. The computing platform of claim 1, wherein the first recipient computing device associated with the first event is linked to a first alias identified as a recipient in the first event definition information.

6. The computing platform of claim 5, wherein the first alias identified as the recipient in the first event definition information comprises an email address.

7. The computing platform of claim 5, wherein the first alias identified as the recipient in the first event definition information comprises a mobile telephone number.

8. The computing platform of claim 1, wherein identifying the one or more stimulus options available for the first user of the first recipient computing device associated with the first event comprises identifying at least one stimulus option as available for the first user of the first recipient computing device associated with the first event based on the at least one stimulus option being specified by a user of the first client computing device in the first stimulus selection information associated with the first event.

9. The computing platform of claim 1, wherein the event processor is an internal event processor operated by an entity operating the computing platform.

10. The computing platform of claim 1, wherein the event processor is an external event processor operated by a third-party entity not associated with an entity operating the computing platform.

11. The computing platform of claim 1, wherein the memory stores additional computer-readable instructions that, when executed by the at least one processor, cause the computing platform to:

receive, via the communication interface, from a second client computing device, second event definition information defining a second event, the second event definition information comprising second stimulus selection information associated with the second event;

receive, via the communication interface, from a second recipient computing device associated with the second event, a second request for a recipient-selection user interface;

based on receiving the second request for the recipient-selection user interface from the second recipient computing device associated with the second event, identify one or more stimulus options available for a second user of the second recipient computing device associated with the second event based on the second stimulus selection information associated with the second event;

based on identifying the one or more stimulus options available for the second user of the second recipient computing device associated with the second event, send, via the communication interface, to the second recipient computing device associated with the second event, a second delivery selection user interface, the second delivery selection user interface comprising a second user-selectable component that, when invoked, causes the computing platform to create a second new endpoint associated with a second stimulus option of the one or more stimulus options identified as being available for the second user of the second recipient computing device associated with the second event;

receive, via the communication interface, from the second recipient computing device associated with the second event, second delivery selection information, the second delivery selection information comprising information indicating that the second user-selectable component has been invoked, and the second delivery selection information comprising information identifying the second new endpoint associated with the second stimulus option as a second destination for the second event selected by the second user of the second recipient computing device associated with the second event;

based on receiving the second delivery selection information from the second recipient computing device associated with the second event, generate, based on the second delivery selection information, one or more second event orchestration commands directing the event processor to execute one or more actions associated with the second event; and send, via the communication interface, to the event processor, the one or more second event orchestration commands directing the event processor to execute the one or more actions associated with the second event.

12. The computing platform of claim 11, wherein receiving the second event definition information defining the second event comprises receiving information defining one or more parameters of the second event from the second client computing device.

13. The computing platform of claim 12, wherein the information defining the one or more parameters of the second event comprises information defining the second event as a single event having a single occurrence.

14. The computing platform of claim 12, wherein the information defining the one or more parameters of the second event comprises information defining the second event as a recurring event having multiple occurrences.

15. The computing platform of claim 11, wherein the second recipient computing device associated with the second event is linked to a second alias identified as a recipient in the second event definition information.

16. The computing platform of claim 15, wherein the second alias identified as the recipient in the second event definition information comprises an email address.

17. The computing platform of claim 15, wherein the second alias identified as the recipient in the second event definition information comprises a mobile telephone number.

18. The computing platform of claim 11, wherein identifying the one or more stimulus options available for the second user of the second recipient computing device associated with the second event comprises identifying at least one stimulus option as available for the second user of the second recipient computing device associated with the second event based on the at least one stimulus option being specified by a user of the second client computing device in the second stimulus selection information associated with the second event.

19. A method, comprising:
at a computing platform comprising at least one processor, memory, and a communication interface:
receiving, by the at least one processor, via the communication interface, from a first client computing device, first event definition information defining a first event, the first event definition information comprising first stimulus selection information associated with the first event;
receiving, by the at least one processor, via the communication interface, from a first recipient computing device associated with the first event, a first request for a recipient-selection user interface;
based on receiving the first request for the recipient-selection user interface from the first recipient computing device associated with the first event, identifying, by the at least one processor, one or more stimulus options available for a first user of the first recipient computing device associated with the first event based on the first stimulus selection information associated with the first event;

based on identifying the one or more stimulus options available for the first user of the first recipient computing device associated with the first event, sending, by the at least one processor, via the communication interface, to the first recipient computing device associated with the first event, a first delivery selection user interface, the first delivery selection user interface comprising a first user-selectable component that, when invoked, causes the computing platform to create a first new endpoint associated with a first stimulus option of the one or more stimulus options identified as being available for the first user of the first recipient computing device associated with the first event;

receiving, by the at least one processor, via the communication interface, from the first recipient computing device associated with the first event, first delivery selection information, the first delivery selection information comprising information indicating that the first user-selectable component has been invoked, and the first delivery selection information comprising information identifying the first new endpoint associated with the first stimulus option as a first destination for the first event selected by the first user of the first recipient computing device associated with the first event;

based on receiving the first delivery selection information from the first recipient computing device associated with the first event, generating, by the at least one processor, based on the first delivery selection information, one or more first event orchestration commands directing an event processor to execute one or more actions associated with the first event; and sending, by the at least one processor, via the communication interface, to the event processor, the one or more first event orchestration commands directing the event processor to execute the one or more actions associated with the first event.

20. One or more non-transitory computer-readable media storing instructions that, when executed by a computing platform comprising at least one processor, memory, and a communication interface, cause the computing platform to:
receive, via the communication interface, from a first client computing device, first event definition information defining a first event, the first event definition information comprising first stimulus selection information associated with the first event;
receive, via the communication interface, from a first recipient computing device associated with the first event, a first request for a recipient-selection user interface;
based on receiving the first request for the recipient-selection user interface from the first recipient computing device associated with the first event, identify one or more stimulus options available for a first user of the first recipient computing device associated with the first event based on the first stimulus selection information associated with the first event;
based on identifying the one or more stimulus options available for the first user of the first recipient computing device associated with the first event, send, via the communication interface, to the first recipient computing device associated with the first event, a first delivery selection user interface, the first delivery selection user interface comprising a first user-selectable component that, when invoked, causes the computing platform to create a first new endpoint associated with a first stimulus option of the one or more stimulus options identified as being available for the first user of the first recipient computing device associated with the first event;

receive, via the communication interface, from the first recipient computing device associated with the first event, first delivery selection information, the first delivery selection information comprising information indicating that the first user-selectable component has been invoked, and the first delivery selection information comprising information identifying the first new endpoint associated with the first stimulus option as a first destination for the first event selected by the first user of the first recipient computing device associated with the first event;

based on receiving the first delivery selection information from the first recipient computing device associated with the first event, generate, based on the first delivery selection information, one or more first event orchestration commands directing an event processor to execute one or more actions associated with the first event; and send, via the communication interface, to the event processor, the one or more first event orchestration commands directing the event processor to execute the one or more actions associated with the first event.

* * * * *